(12) United States Patent
Miyamoto et al.

(10) Patent No.: US 10,015,337 B2
(45) Date of Patent: Jul. 3, 2018

(54) RECORDING APPARATUS

(71) Applicant: SEIKO EPSON CORPORATION, Tokyo (JP)

(72) Inventors: Yuji Miyamoto, Shiojiri (JP); Masaki Shimomura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/799,672

(22) Filed: Oct. 31, 2017

(65) Prior Publication Data

US 2018/0139340 A1 May 17, 2018

(30) Foreign Application Priority Data

Nov. 17, 2016 (JP) ................................ 2016-224291

(51) Int. Cl.
| | |
|---|---|
| *H04N 1/00* | (2006.01) |
| *B41J 29/38* | (2006.01) |
| *B65H 1/26* | (2006.01) |
| *B41J 2/01* | (2006.01) |

(52) U.S. Cl.
CPC .......... *H04N 1/00708* (2013.01); *B41J 29/38* (2013.01); *B65H 1/26* (2013.01); *H04N 1/00599* (2013.01); *H04N 1/00702* (2013.01); *H04N 1/00761* (2013.01); *H04N 1/00795* (2013.01); *B41J 2/01* (2013.01); *H04N 2201/0422* (2013.01)

(58) Field of Classification Search
CPC .......... H04N 1/00708; H04N 1/00795; H04N 1/00599; H04N 1/00702; H04N 1/00761; H04N 2201/0422; B65H 1/26; B41J 29/38; B41J 2/01
See application file for complete search history.

(56) References Cited

U.S. PATENT DOCUMENTS

| | | | | |
|---|---|---|---|---|
| 8,419,013 B2 * | 4/2013 | Muneyasu | ............ | B65H 9/004 271/246 |
| 2008/0296828 A1 * | 12/2008 | Shoji | ........................ | B65H 7/02 271/10.12 |

FOREIGN PATENT DOCUMENTS

JP        11-165881        6/1999

* cited by examiner

Primary Examiner — Kent Yip
(74) Attorney, Agent, or Firm — Workman Nydegger

(57) ABSTRACT

Provided is a recording apparatus capable of accurate positioning and size detection in accordance with a medium size in a paper feed cassette capable of supporting media of a plurality of sizes.

5 Claims, 20 Drawing Sheets

RECORDING APPARATUS

BACKGROUND

1. Technical Field

The present invention relates to a recording apparatus that performs recording on a medium that is fed from a paper feed cassette.

2. Related Art

A recording apparatus, which is exemplified by a printer, includes a paper feed cassette, which contains a medium and can be removed from an apparatus main body, feeds the medium from the paper feed cassette, transports the medium to a recording region of a recording section and performs recording. Such a paper feed cassette is capable of containing media of various sizes and includes a rear end guide that determines, in accordance with the size of a contained medium, the rear end position of the medium in a sheet feeding direction (for example, JP-A-11-165881).

In JP-A-11-165881, a tray main body 11 (the paper feed cassette) includes, in the vicinity of one end portion of the tray main body 11 in a direction orthogonal to a paper feeding direction 12, a cam-equipped gear 18 as a movement direction transmitting unit for transmitting movement (linear movement) in the paper feeding direction of a paper-feed-direction paper sheet guide 15 (the rear end guide) or in the opposite direction also as linear movement, the linear movement transmitted by the cam-equipped gear 18 is detected by detection mechanisms arranged at a plurality of positions along the paper feeding direction 12, and the size of the medium contained in the tray main body 11 is detected.

The cam-equipped gear 18 rotates about a fulcrum 17 in accordance with the movement position of the paper-feed-direction paper sheet guide 15 that moves in the paper feeding direction 12 along a cam groove 22. In addition, a pin 23 that is provided in the paper-feed-direction paper sheet guide 15 engages with the cam groove 22. In the cam-equipped gear 18, the cam groove 22 is formed in an arc shape in order to change the linear movement of the paper-feed-direction paper sheet guide 15 into rotation (rotational movement) of the cam-equipped gear 18.

Hereinafter, with reference to FIG. 20, the rotation of a cam member (corresponding to the cam-equipped gear 18) by linear movement of a rear end guide (corresponding to the paper-feed-direction paper sheet guide 15) will be described in more detail.

In addition, the cam groove 22 of JP-A-11-165881 has a step-like shape; however, in FIG. 20, an arc-shaped cam groove 101 that does not have the step-like shape is illustrated. In FIG. 20, reference sign 101 denotes a cam groove 101 provided in a cam member (the cam-equipped gear 18 in JP-A-11-165881) and reference sign 106 denotes a pin 106 that is provided on the rear end guide and that functions as a shaft portion that moves integrally with the rear end guide. Moreover, reference sign 107 denotes the rotation center 107 of the cam member.

In the case where the pin 106 moves linearly from the upper side to the lower side in FIG. 20, as illustrated in the left figure of FIG. 20, from the position A' at one end portion 102 of the cam groove 101, which is arc-shaped, through the position B' to the position C' (before the position D' in the center figure of FIG. 20), because the pin 106 comes into contact with an inner wall 103 of the cam groove 101, which is arc-shaped, and pushes downward, the cam groove 101 pivots in the clockwise direction in plan view in FIG. 20.

However, when the pin 106 moves downward from the position D' with the position D' as a boundary in the center figure of FIG. 20, that is, until the pin 106 reaches the position G' at another end portion 105 of the cam groove 101 after moving through the position E' and the position F' in the right figure of FIG. 20, the cam groove 101 rotates in the clockwise direction in plan view in FIG. 20 as a result of the pin 106 coming into contact with an outer wall 104 of the arc-shaped cam groove 101 and pushing it downward. In addition, the position D' at which the contact position of the pin 106 in the cam groove 101 is switched is a position at which the pin 106 is right beside a rotation center 107 (a position at which a line 108 connecting the pin 106 and the rotation center 107 is perpendicular to a movement locus 109 of the pin 106).

Here, at the position D' at which the contact position of the pin 106 in the cam groove 101 is switched, the movement force of the pin 106 is neither applied to the inner wall 103 nor the outer wall 104 of the cam groove 101. Therefore, when the pin 106 is present at the position D', the linear movement of the pin 106 and the rotation of the cam groove 101 and hence the cam member do not cooperate with each other.

Consequently, when the pin 106 is in the vicinity of the position D', the accuracy of correspondence between the linear movement of the pin 106 and the rotation of the cam member is low, and there is a possibility that the size of the medium cannot be accurately detected.

Moreover, when the pin 106 is present at the position D' and the movement force of the pin 106 is neither applied to the inner wall 103 nor the outer wall 104 of the cam groove 101, because the rotation of the cam groove 101 is not fixed by the pin 106, for example, in the case where the paper feed cassette is inserted into or removed from the main body of the apparatus or is subjected to an impact as a result of the paper feed cassette being dropped, the cam groove 101 moves before the pin 106 does and there is a possibility that the positional relationship between the cam groove 101 and the pin 106 changes. If the positional relationship between the cam groove 101 and the pin 106 changes, there is a possibility that the rear end guide cannot move normally.

SUMMARY

An advantage of some aspects of the invention is that a recording apparatus is provided that is capable of accurate positioning and size detection in accordance with the size of a medium in a paper feed cassette capable of supporting media of a plurality of sizes.

A recording apparatus according to an aspect of the invention includes a paper feed cassette detachably provided in an apparatus main body and capable of containing media of a plurality of sizes, a rear end guide that is provided in the paper feed cassette, that guides a rear end of a contained medium in a feeding direction and that can move in a direction along the feeding direction in accordance with a size of the medium, a cam member that is provided so as to be rotatable about a rotation fulcrum provided in the paper feed cassette, that engages a shaft portion provided on the rear end guide, and that rotates in accordance with movement of the rear end guide, a size detector that detects the size of the medium by detecting a rotation state of the cam member, the cam member having a cam groove that converts linear movement of the shaft portion interlocked with movement of the rear end guide into rotational movement of the cam member about the rotation fulcrum, the cam groove including one end, at which the shaft portion is located when the rear end guide guides a medium of the smallest size among the media of the plurality of sizes, another end, at which the shaft portion is located when the rear end guide guides a medium of the largest size among the media of the plurality of sizes, and a pair of a first edge portion and a second edge portion that extend so as to oppose each other from the one end to the other end, and being formed such that, when the shaft portion moves with respect to the cam groove from the one end to the other end of the cam groove, an external force applying portion that applies an external force to the cam groove in order to make the shaft portion rotate the cam member switches from the first edge portion to the second edge portion in a region between the one end and the other end, the region being, from among guide positions between a guide position of the rear end guide for the medium of the smallest size to a guide position of the rear end guide for the medium of the largest size, set between guide positions corresponding to a first medium and a second medium having a relationship in which sizes thereof in the longitudinal direction are close to each other and a movement distance of the rear end guide in the longitudinal direction is the largest.

When the shaft portion moves with respect to the cam groove from the one end to the other end of the cam groove, in the case of the cam groove in which the external force applying portion that applies an external force to the cam groove in order to make the shaft portion rotate the cam member is switched from the first edge portion to the second edge portion in the region between the one end and the other end, as described above, the movement force of the shaft portion is not transmitted to either of the first edge portion and the second edge portion or is not easily transmitted to either of the first edge portion and the second edge portion.

That is, because the external force is not transmitted from the shaft portion to the cam groove or is not easily transmitted from the shaft portion to the cam groove, the accuracy of correspondence between the linear movement of the shaft portion and the rotational movement of the cam member is reduced.

Here, because the region is, from among guide positions between the guide position of the rear end guide for the medium of the smallest size to the guide position of the rear end guide for the medium of the largest size, set between the guide positions corresponding to the first medium and the second medium having the relationship in which the sizes thereof in the longitudinal direction are close to each other and the movement distance of the rear end guide in the longitudinal direction is the largest, when the external force applying portion switches from the first edge portion to the second edge portion, it is possible to reduce the influence of the reduction of the accuracy of correspondence between the linear movement of the shaft portion and the rotation of the cam member. Therefore, the accuracy of positioning and size detection of various size media increases.

It is preferable that the recording apparatus may further include a cam follower that is provided at a position away from the rear end guide in the width direction that intersects the feeding direction, and that moves along the feeding direction in accordance with rotation of the cam member. Here, the size detector includes at least two or more levers that switch on and off in accordance with a protruding state of protruding in one direction and a retracted state of being retracted more than the protruding state in a direction opposite to the one direction and a control unit for determining the size of the medium on the basis of an on and off combination of the two or more levers, and the cam follower includes a detection plate that has slit portions that enable the levers to be in the protruding state and a plate surface portion that maintains the levers in the retracted state and that is capable of switching between on and off combinations of the two or more levers in accordance with a position of the cam follower.

In this case it is possible to detect the size of the medium contained in the paper feed tray by using the size detector that includes at least two or more levers having a configuration for switching on and off in accordance with a protruding state of protruding in one direction and a retracted state of being retracted more than the protruding state in a direction opposite to the one direction and that includes a control unit for determining the size of the medium on the basis of on and off combinations of the two or more levers and by using the cam follower that includes the detection plate that has slit portions that correspond to the levers and that enable the levers to be in the protruding state and a plate surface portion that maintains the levers in the retracted state and that is capable of switching between the on and off combinations of the two or more levers in accordance with the position of the cam follower.

It is preferable that the first edge portion and the second edge portion of the cam groove may be formed in a curved shape that is convex toward a side of the rotation fulcrum.

In this case, because the first edge portion and the second edge portion of the cam groove are formed in a curved shape convex toward the side of the rotation fulcrum, the shaft portion that moves along the first edge portion or the second edge portion of the cam groove moves smoothly thereby realizing smooth operation of the rear end guide.

It is preferable that the recording apparatus may further include a first rack portion that is provided, as a moving mechanism of the rear end guide, on the paper feed cassette and that extends in a movement direction of the rear end guide, and a pinion gear that is provided on the shaft portion of the rear end guide and that engages the first rack portion, and a second rack portion that engages with the pinion gear when the cam groove has the shaft portion present in a transmission failure region where it is difficult to transmit a movement force of the shaft portion to the cam member.

In this case, because the cam member includes a second rack portion that engages with the pinion gear when the shaft portion is present in a transmission failure region in the cam groove where it is difficult to transmit the movement force of the shaft portion to the cam member, the positional relationship between the shaft portion and the cam groove can be fixed when the shaft portion is positioned in the transmission failure region. Therefore, even when an impact is applied to the sheet feed cassette when the shaft portion is positioned in the transmission failure region, it is possible to reduce the likelihood that the positional relationship between the shaft portion and the cam groove changes.

It is preferable that the cam groove may include, in the transmission failure region, a wide portion formed by cutting out at least one of the first edge portion and the second edge portion.

While the pinion gear of the shaft portion is in the transmission failure region and linearly moving while engaged with the second rack portion of the cam member, the cam member cannot rotate about the rotation fulcrum. If the cam member does not rotate about the rotation fulcrum, the shaft portion, which moves linearly as is, strikes the fixed cam groove and cannot proceed.

In this case, because the cam groove includes, in the transmission failure region, the wide portion formed by cutting out at least one of the first edge portion and the second edge portion, the cam groove may be configured so that the cam groove does not hinder the movement of the shaft portion in the transmission failure region in which the pinion gear of the shaft portion engages with the second rack portion of the cam member and moves linearly.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment 1

First, an overview of a recording apparatus according to Embodiment 1 of the invention will be described. An ink jet printer (hereinafter simply referred to as a printer) is provided as an example of the recording apparatus of this embodiment.

Figure 1:
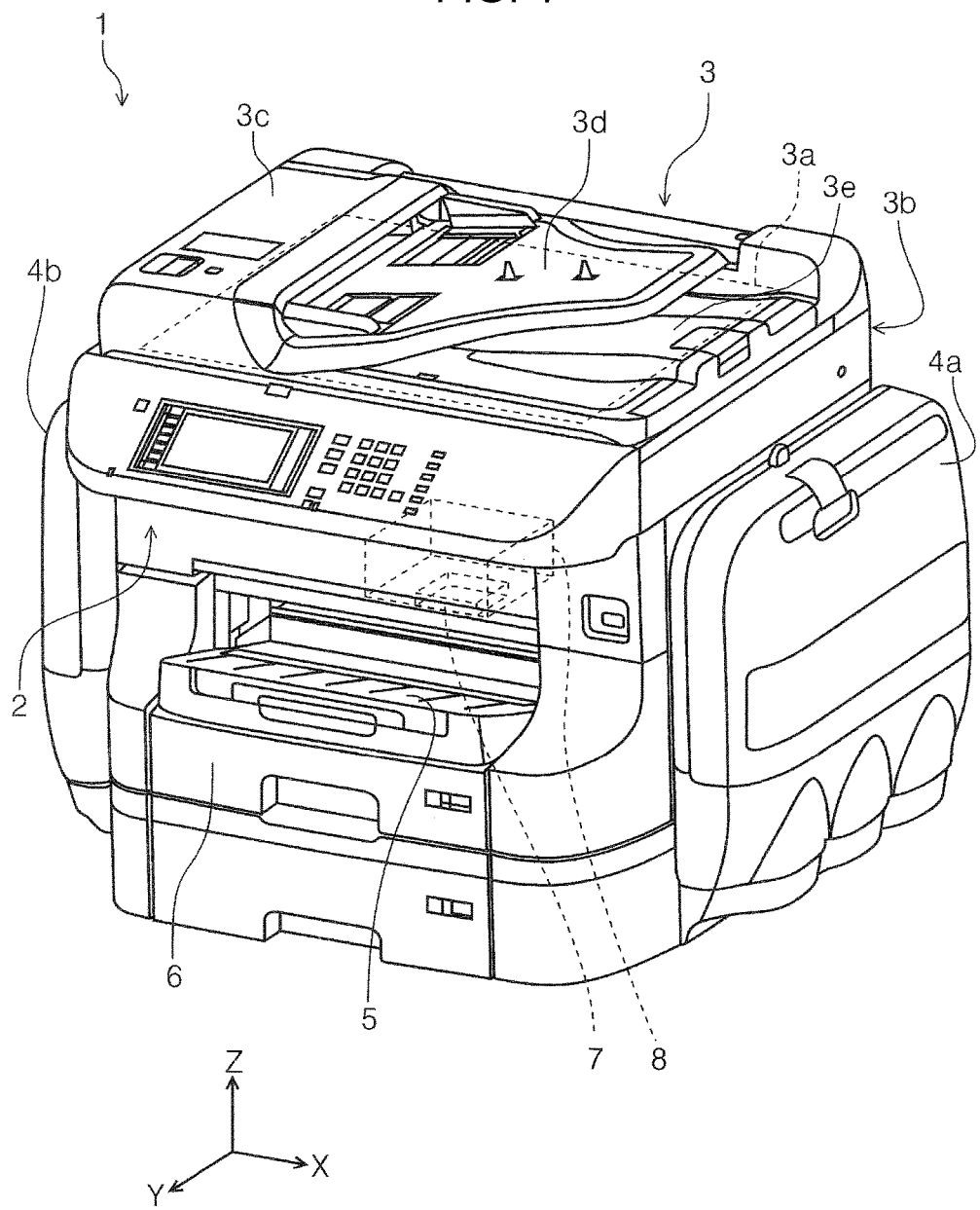
FIG. 1 is an external perspective view of an example of a printer according to the invention.
Figure 2:
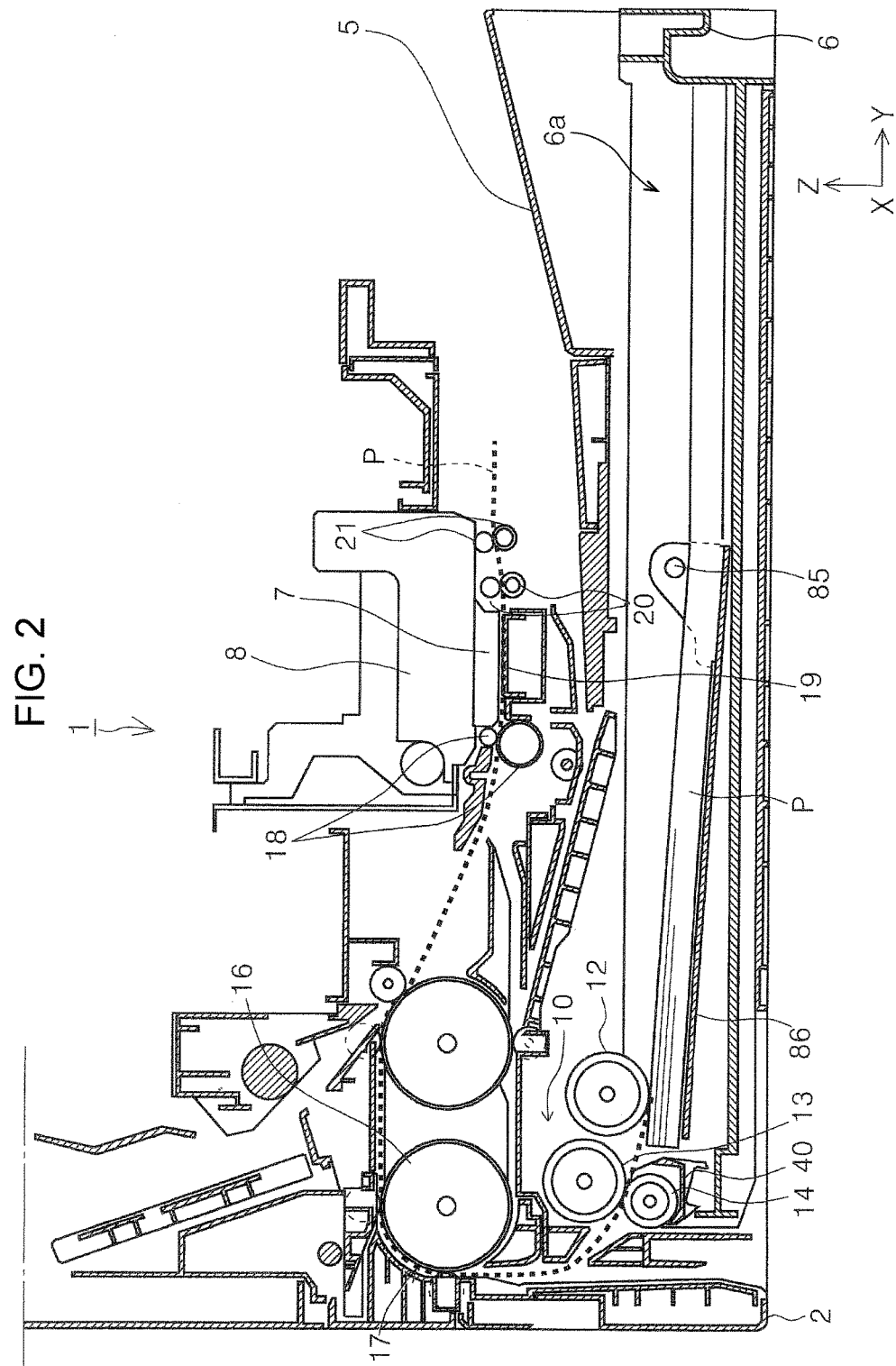
FIG. 2 is a side cross-sectional view of a paper sheet transport path of the printer according to the invention.
Figure 3:
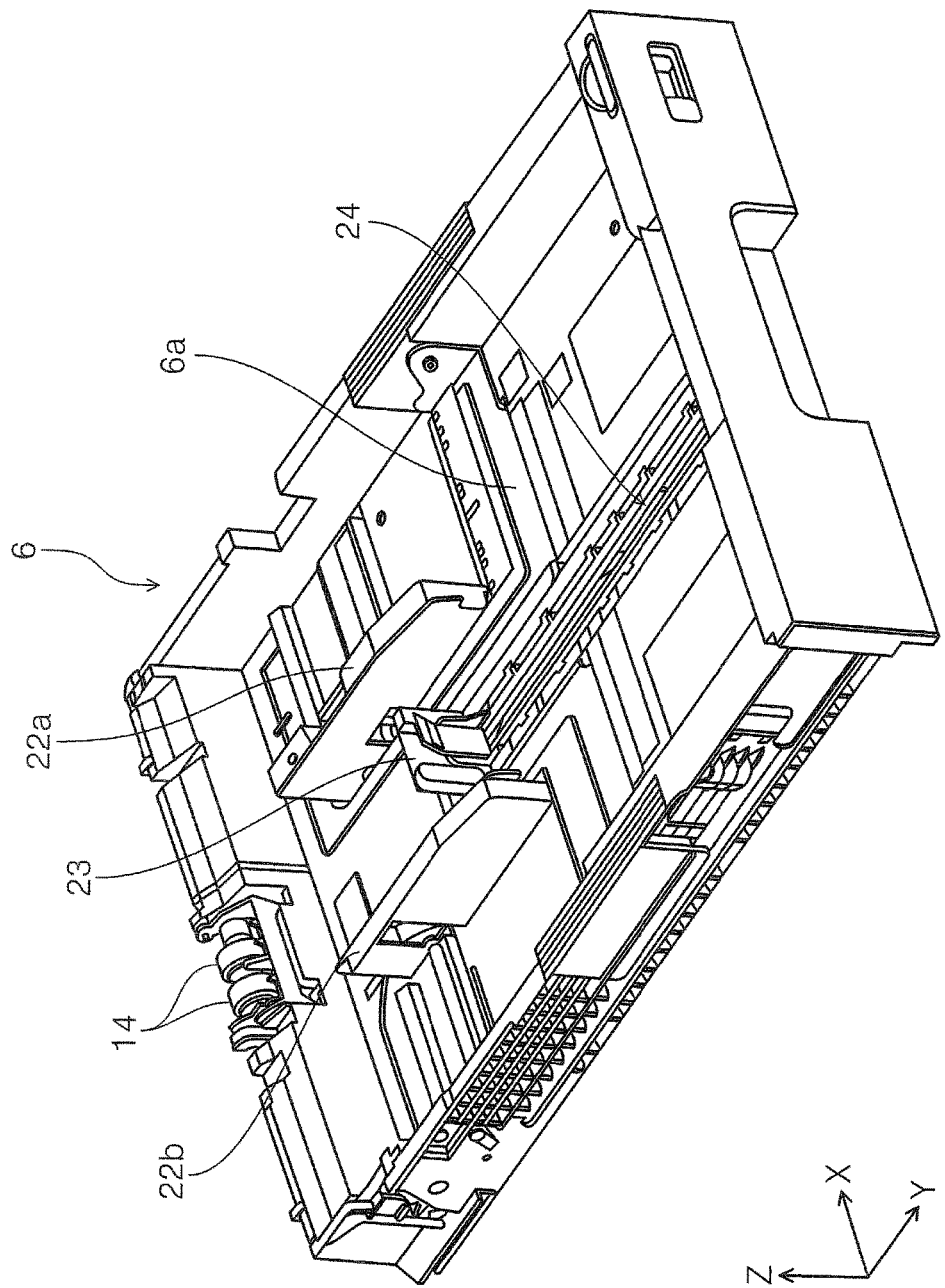
FIG. 3 is a perspective view of a paper feed cassette of the printer according to the invention.
Figure 4:
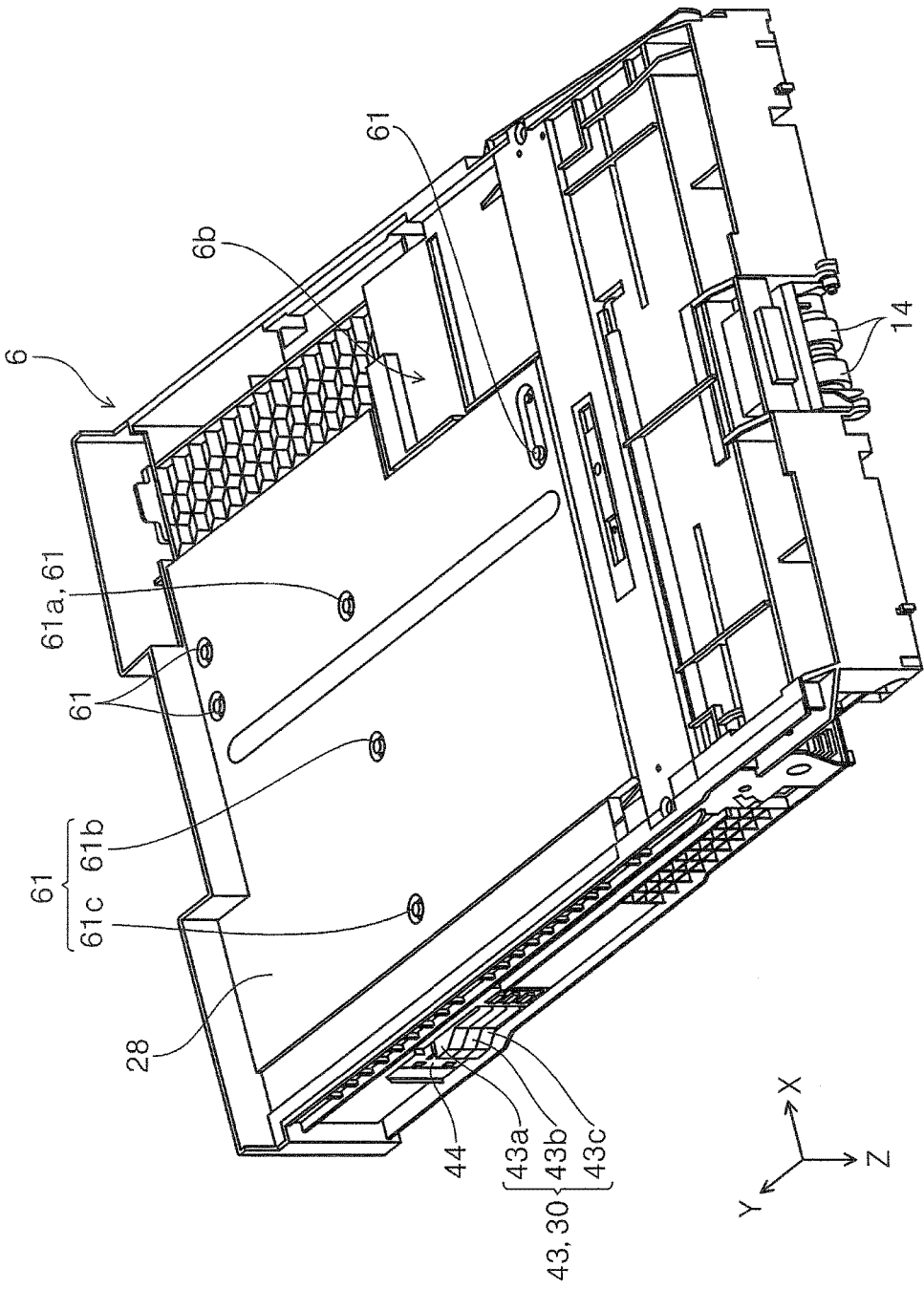
FIG. 4 is a perspective view of the paper feed cassette illustrated in FIG. 3 viewed from a rear surface side thereof.
Figure 5:
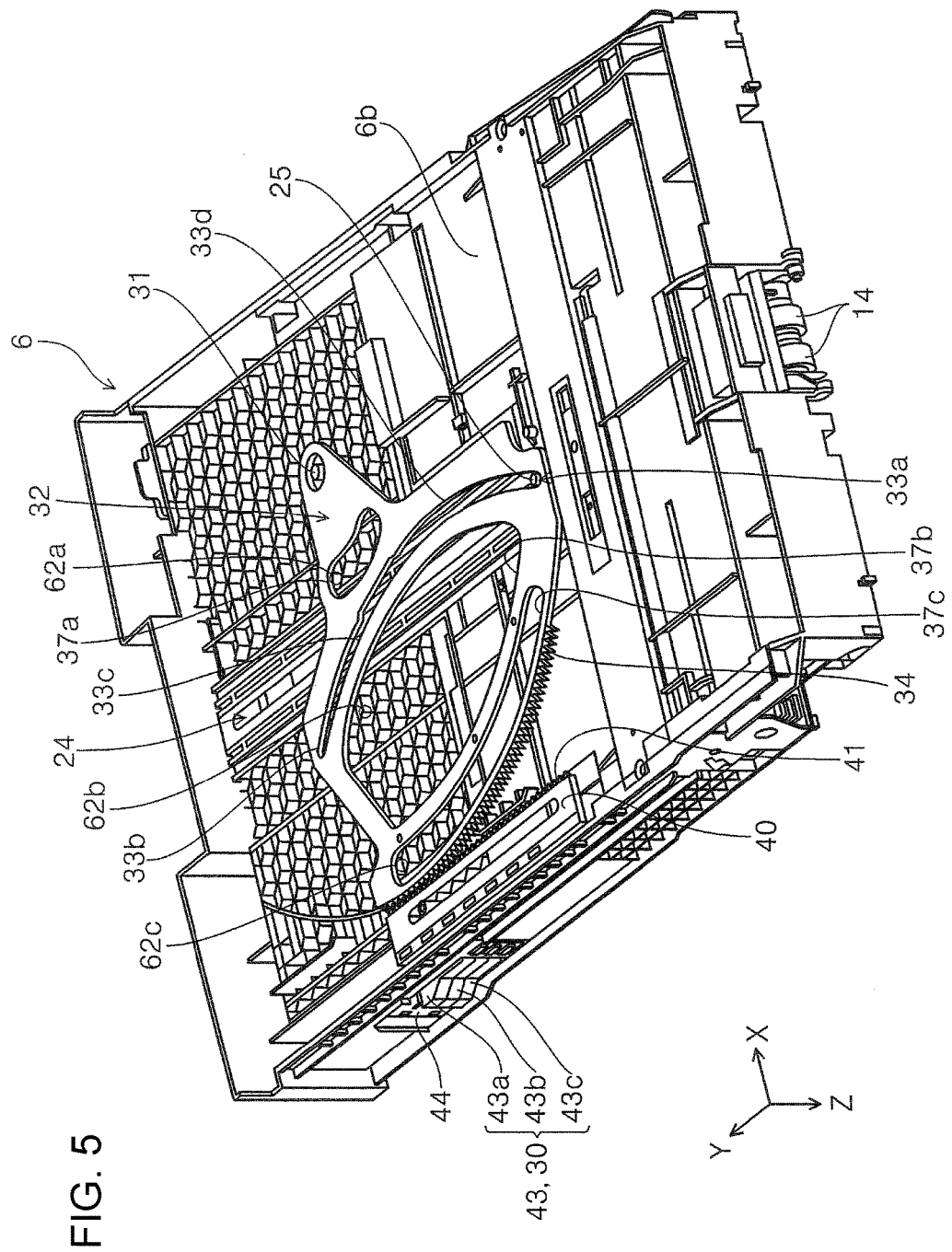
FIG. 5 is a diagram illustrating a state in which a rear cover of the paper feed cassette illustrated in FIG. 4 has been removed.
Figure 6:
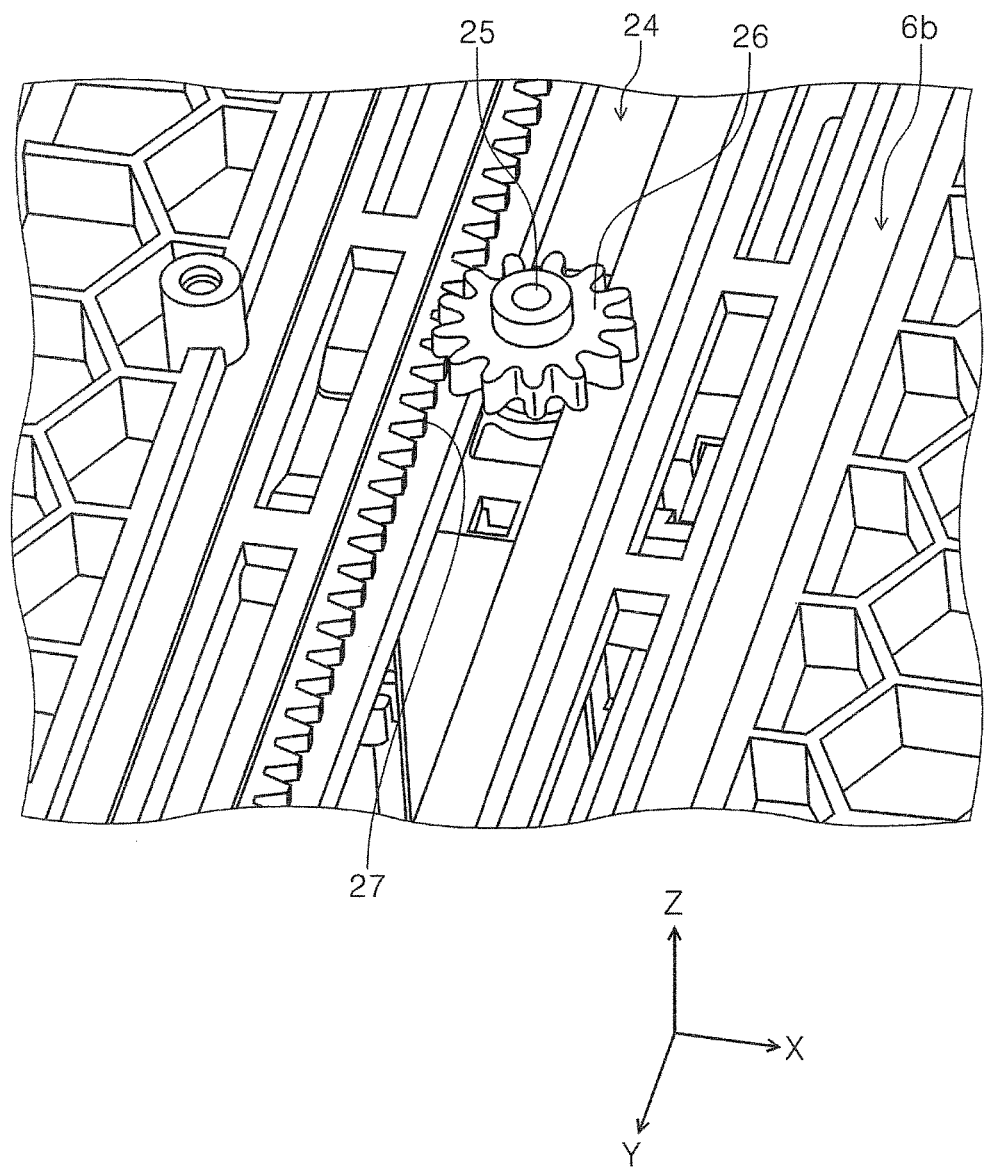
FIG. 6 is an enlarged perspective view of a main portion of the paper feed cassette illustrated in FIG. 5 in a state in which a cam member thereof has been removed.

FIG. 1 is an external perspective view of an example of a printer according to the invention. FIG. 2 is a side cross-sectional view of a paper sheet transport path of the printer according to the invention. FIG. 3 is a perspective view of a paper feed cassette of the printer according to the invention. FIG. 4 is a perspective view of the paper feed cassette illustrated in FIG. 3 viewed from a rear surface side thereof. FIG. 5 is a diagram illustrating a state in which a rear cover of the paper feed cassette illustrated in FIG. 4 has been removed. FIG. 6 is an enlarged perspective view of a main portion of the paper feed cassette illustrated in FIG. 5 in a state in which a cam member thereof has been removed.

Figure 7:
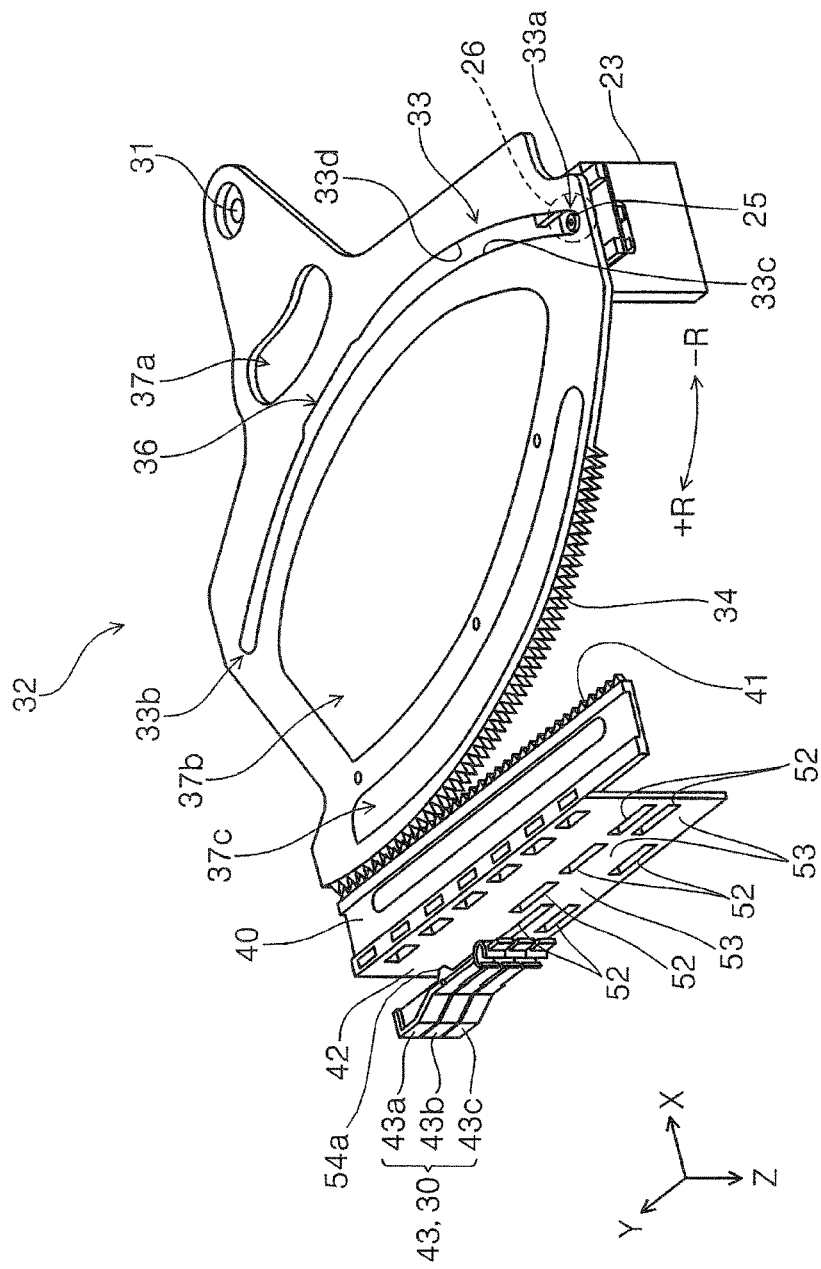
FIG. 7 is a diagram explaining a relationship between a rear end guide, the cam member and a cam follower of the paper feed cassette illustrated in FIG. 6.
Figure 8:
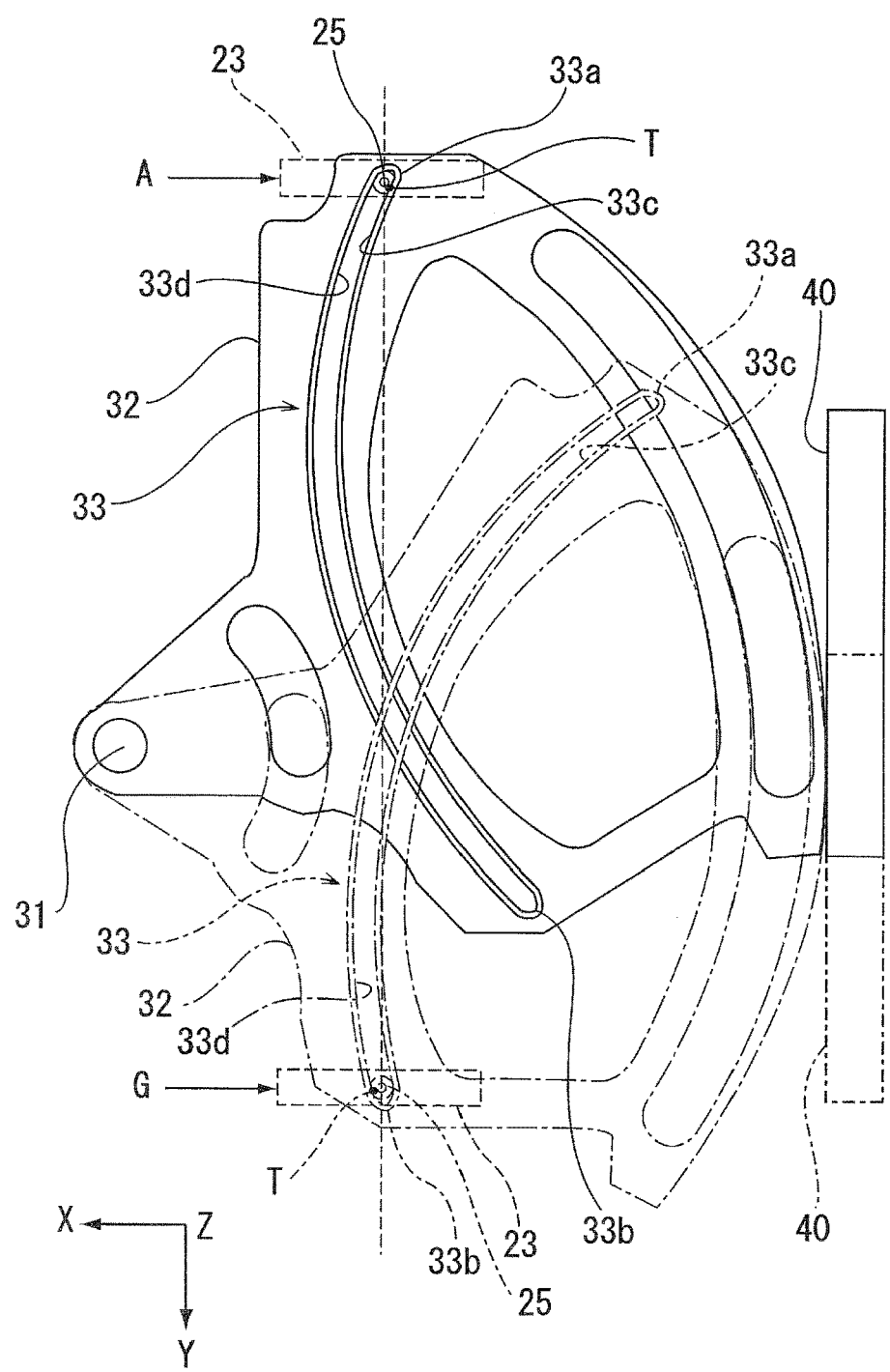
FIG. 8 is a schematic plan view of the cam member and the cam follower.
Figure 9:
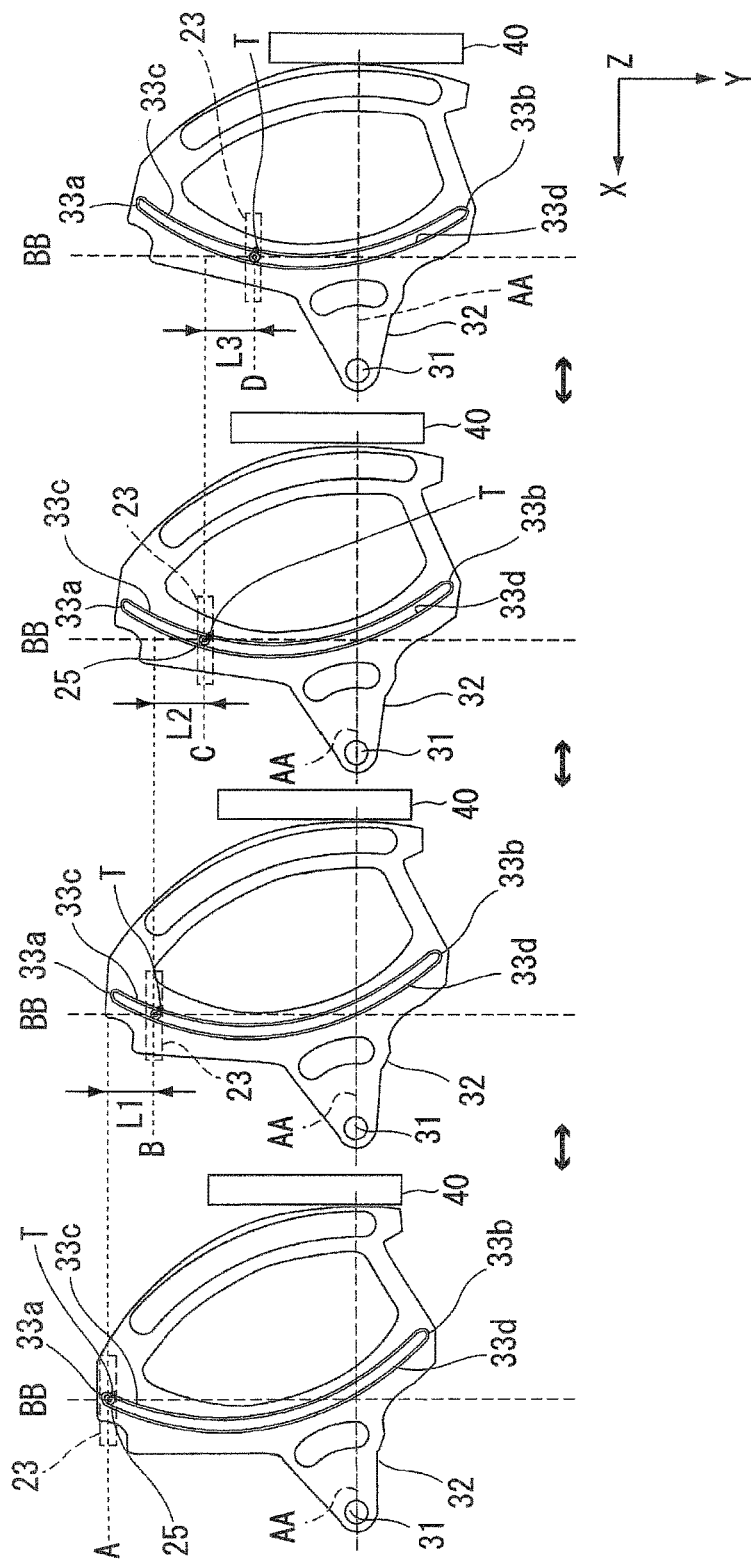
FIG. 9 is a diagram illustrating movement of the cam member.
Figure 10:
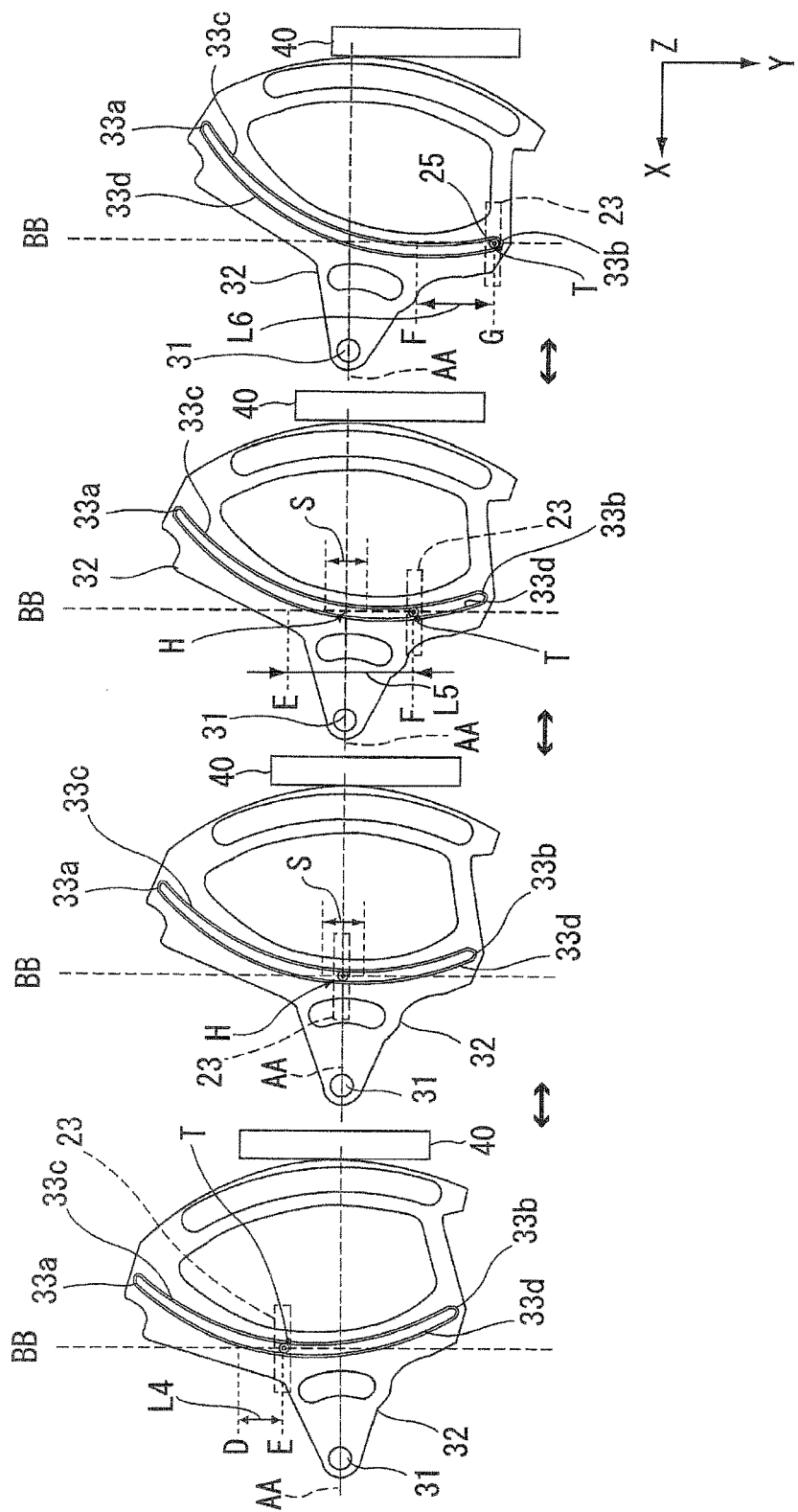
FIG. 10 is a diagram illustrating movement of the cam member.
Figure 11:
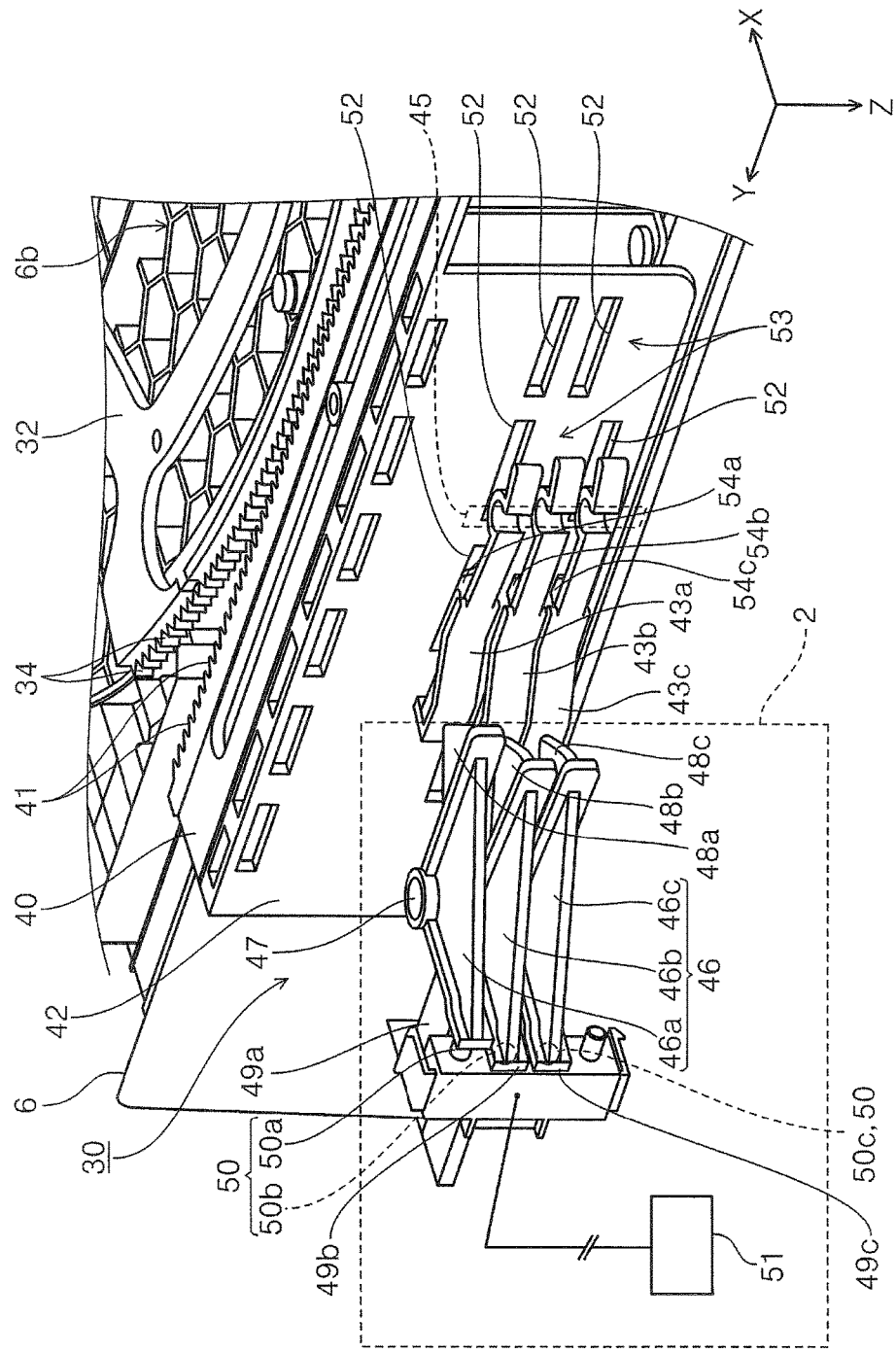
FIG. 11 is a diagram explaining a size detector.
Figure 12:
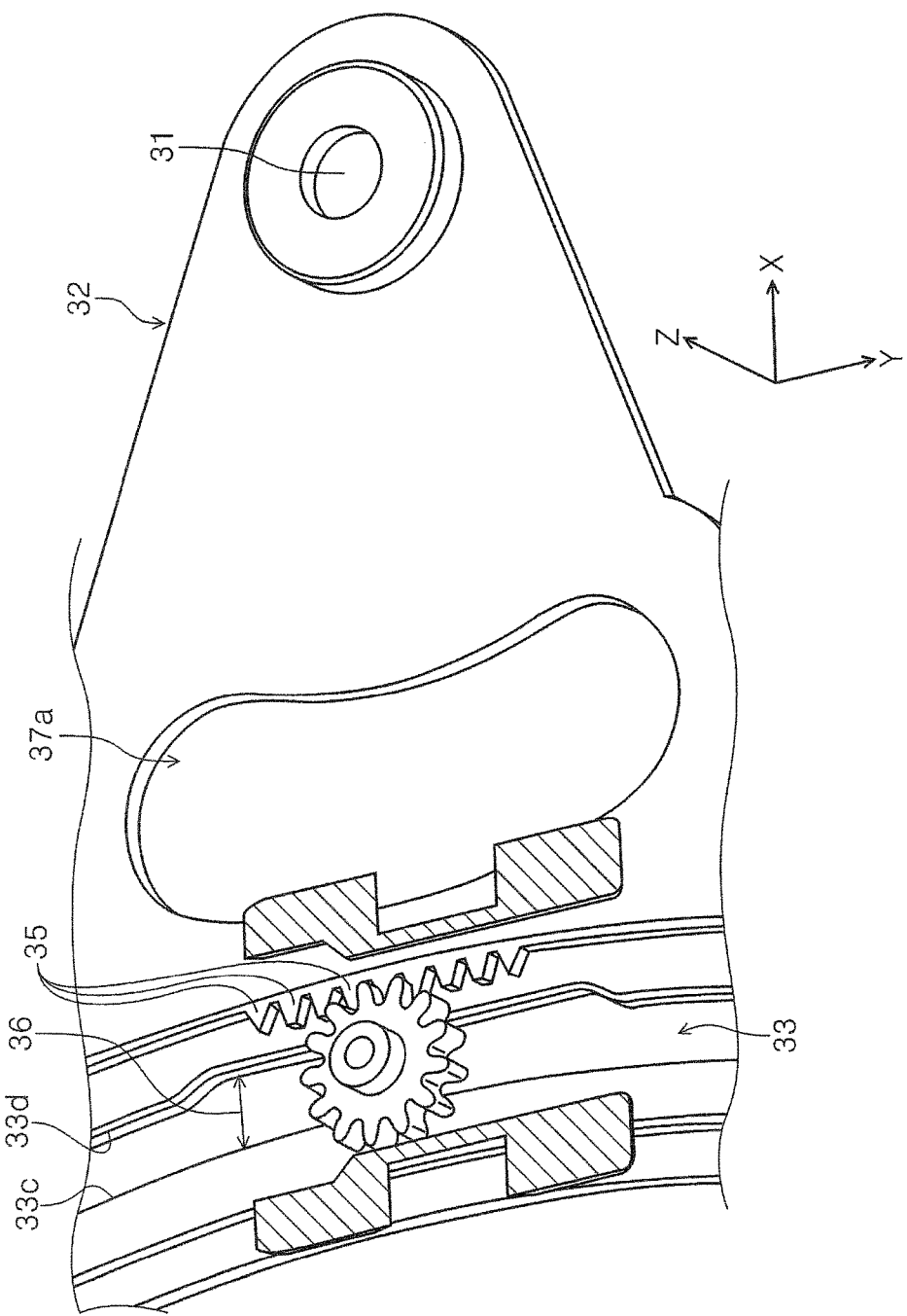
FIG. 12 is an enlarged view of a main portion of a side of the cam member that faces a rear surface of the paper feed cassette.
Figure 13:
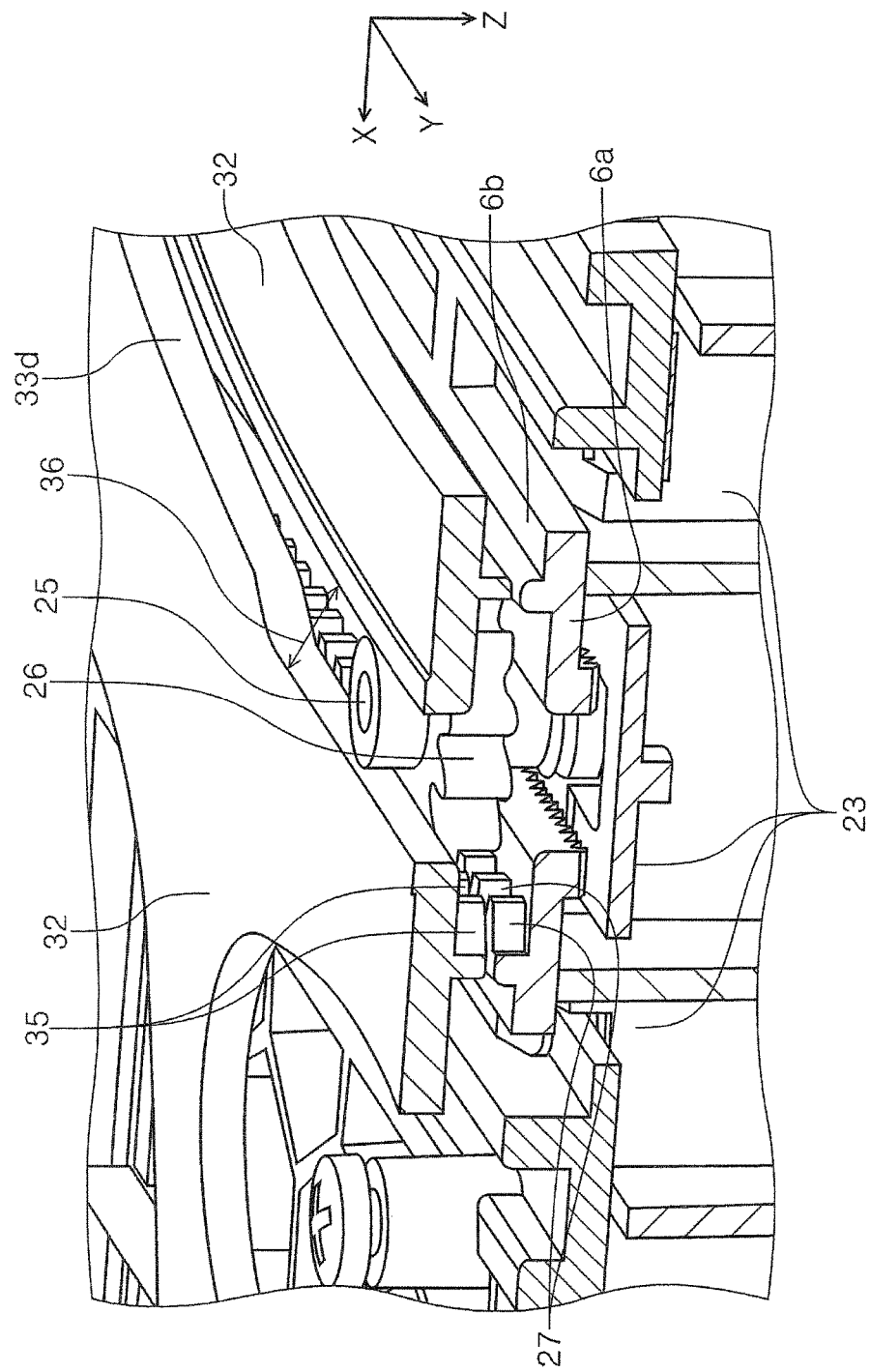
FIG. 13 is a cross-sectional perspective view of a wide portion of a cam groove.
Figure 14:
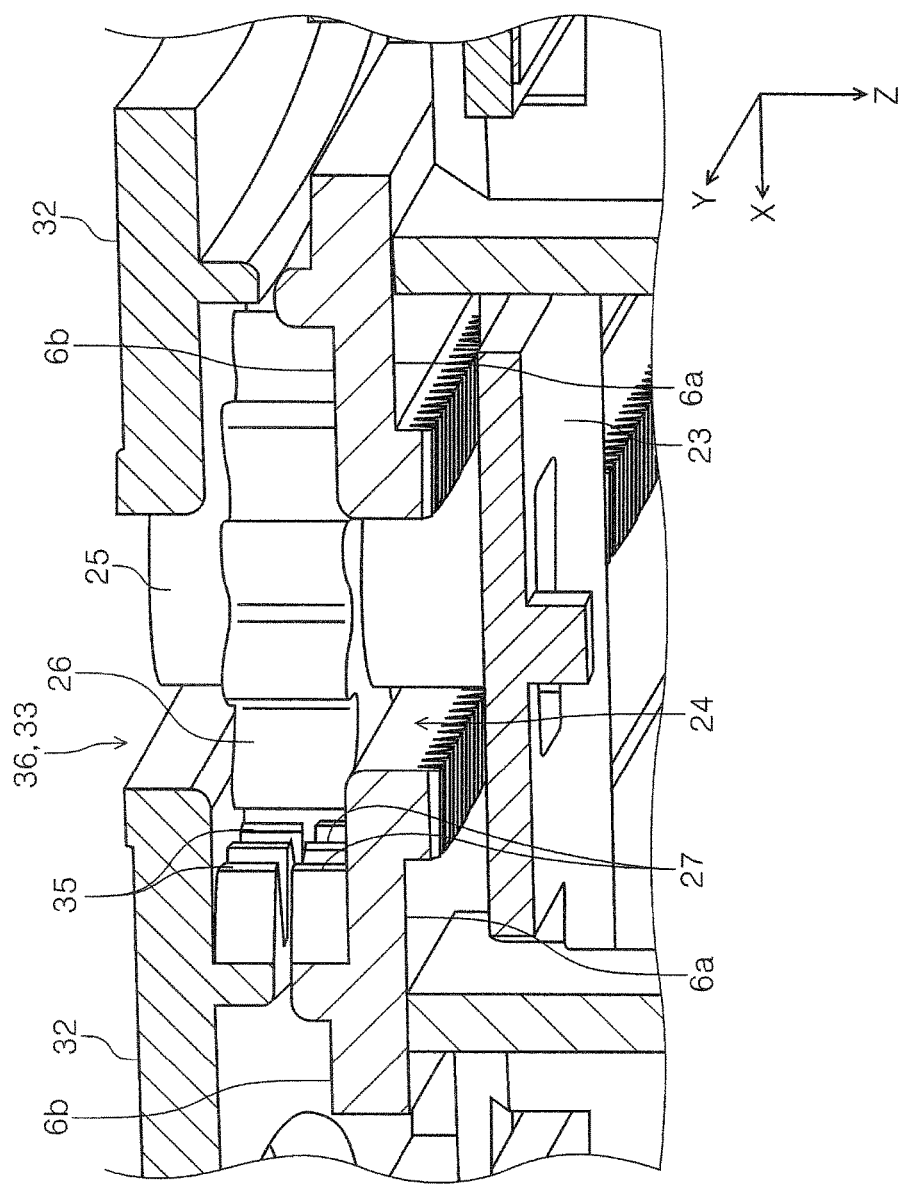
FIG. 14 is a cross-sectional perspective view of FIG. 13 viewed from another angle.

FIG. 7 is a diagram explaining a relationship between a rear end guide, the cam member and a cam follower of the paper feed cassette illustrated in FIG. 6. FIG. 8 is a schematic plan view of the cam member and the cam follower. FIG. 9 is a diagram illustrating movement of the cam member. FIG. 10 is a diagram illustrating movement of the cam member. FIG. 11 is a diagram explaining a size detector. FIG. 12 is an enlarged view of a main portion of a side of the cam member that faces a rear surface of the paper feed cassette. FIG. 13 is a cross-sectional perspective view of a wide portion of a cam groove. FIG. 14 is a cross-sectional perspective view of FIG. 13 viewed from another angle.

Figure 15:
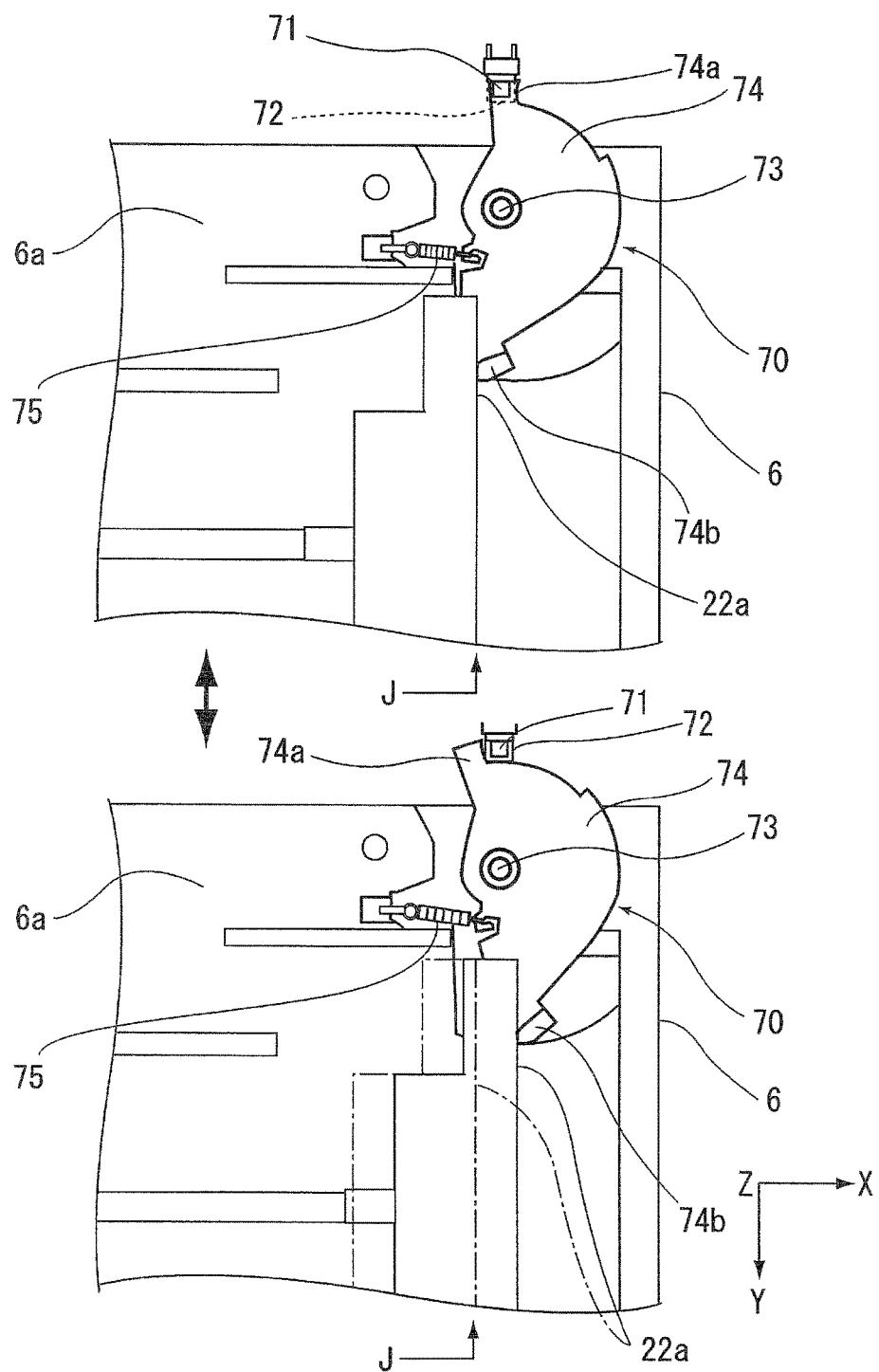
FIG. 15 is a diagram explaining an example of a width direction detector.
Figure 16:
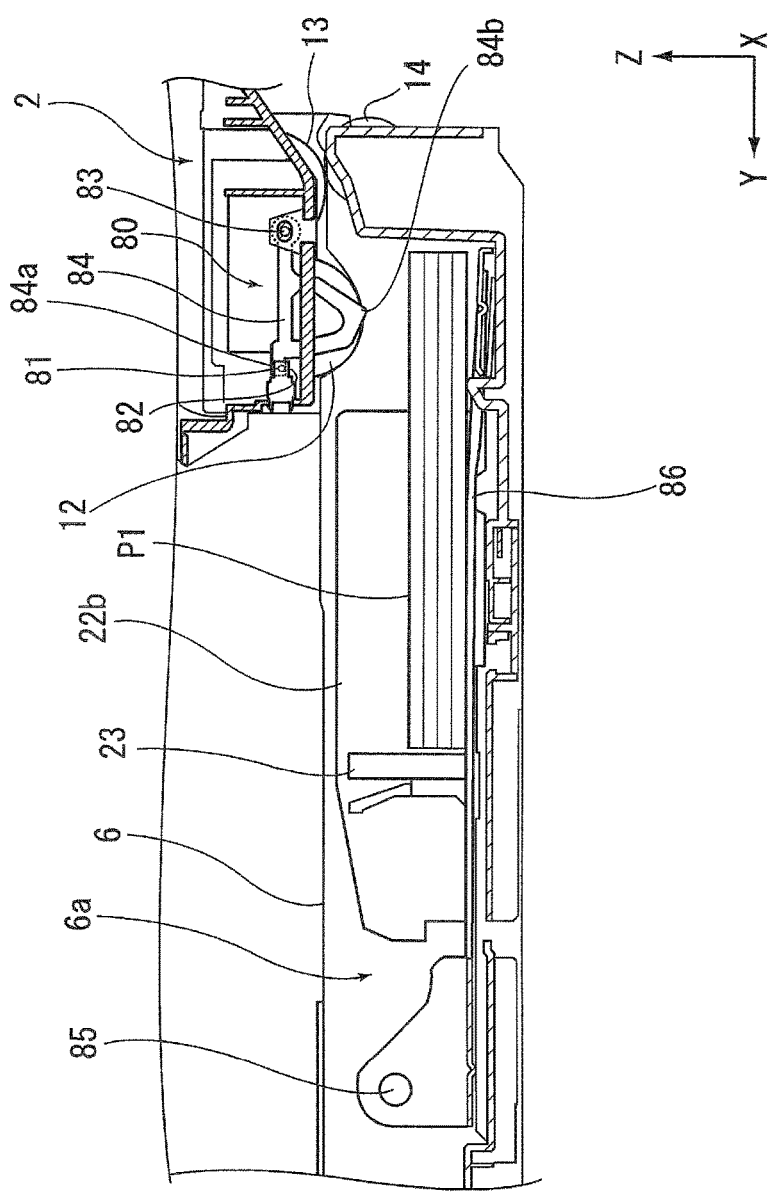
FIG. 16 is a side view illustrating another example of the width direction detector.
Figure 17:
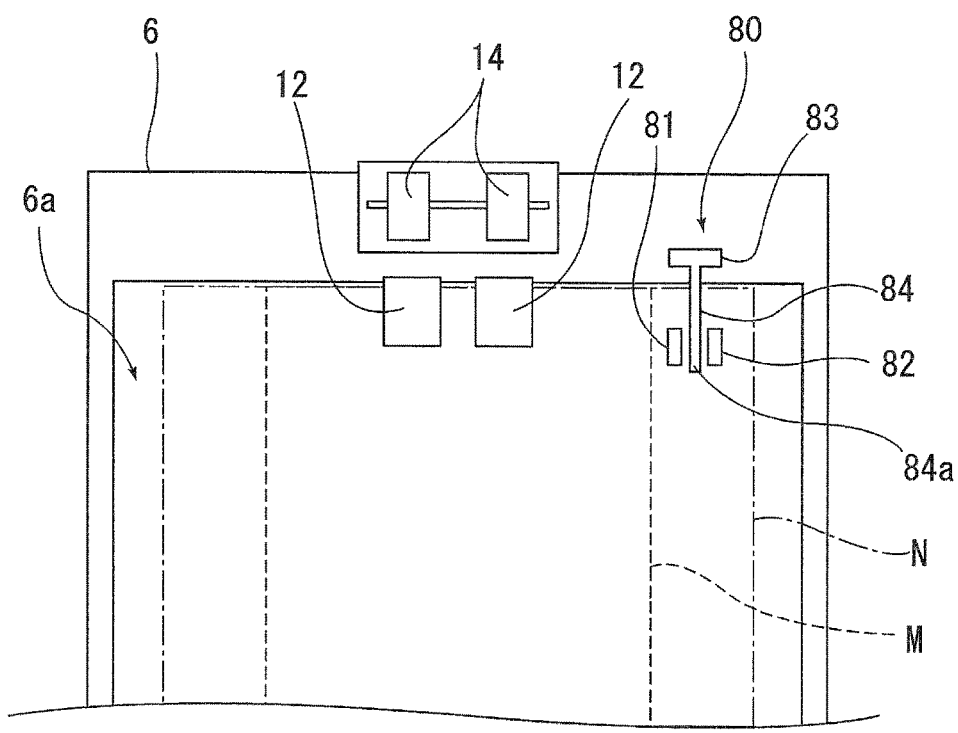
FIG. 17 is a diagram illustrating another example of the width direction detector.
Figure 18:
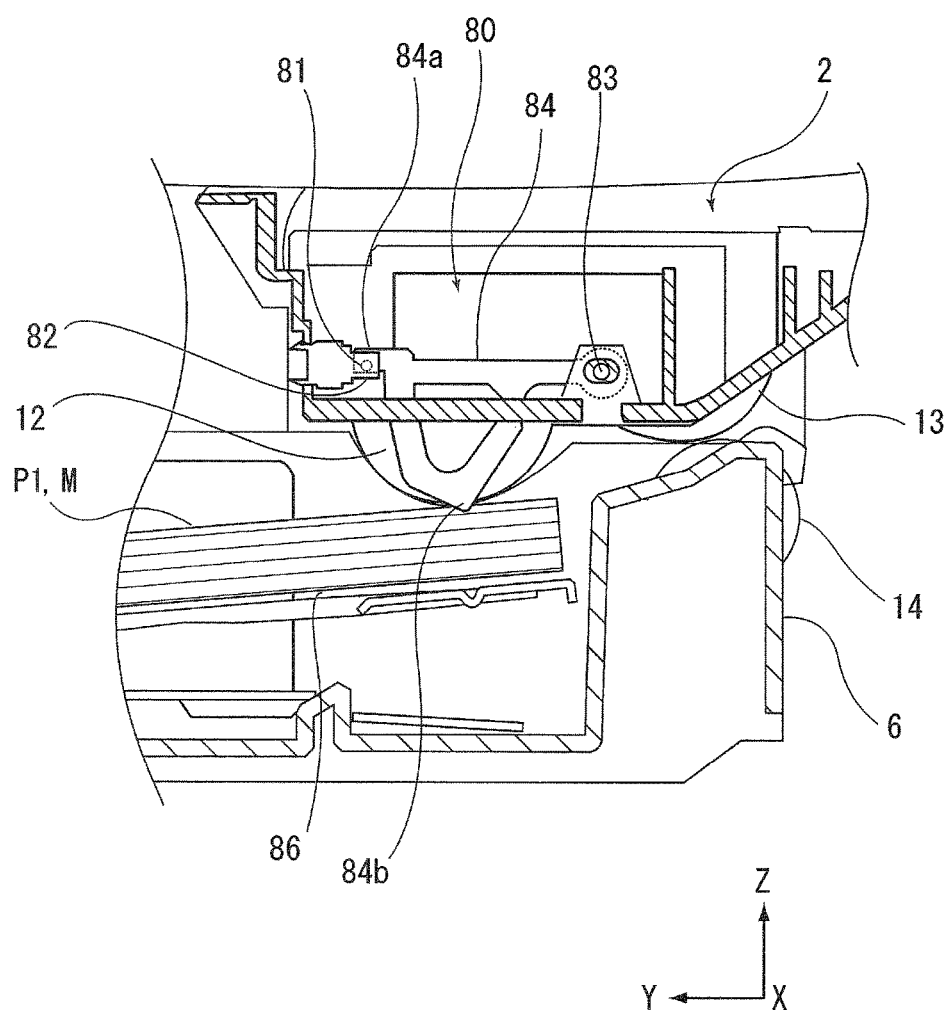
FIG. 18 is a diagram illustrating a state of a lever member at the time of feeding a paper sheet of size M shown in FIG. 17.
Figure 19:
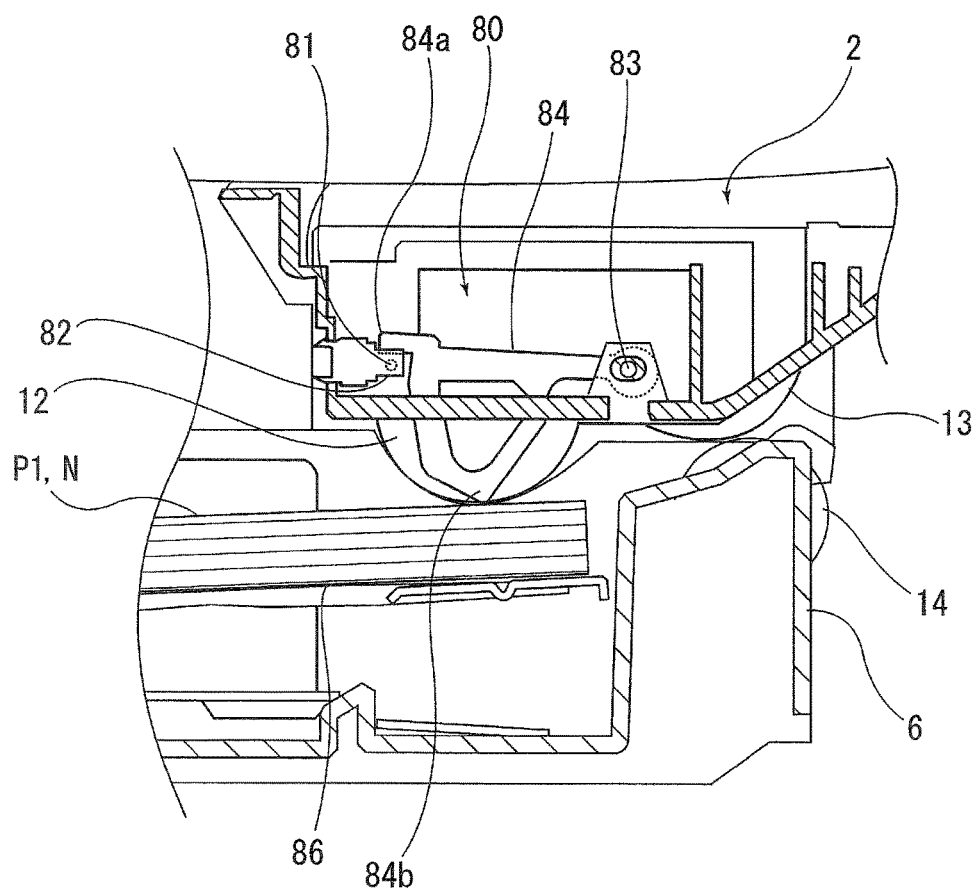
FIG. 19 is a diagram illustrating a state of the lever member at the time of feeding a paper sheet of size N shown in FIG. 17.
Figure 20:
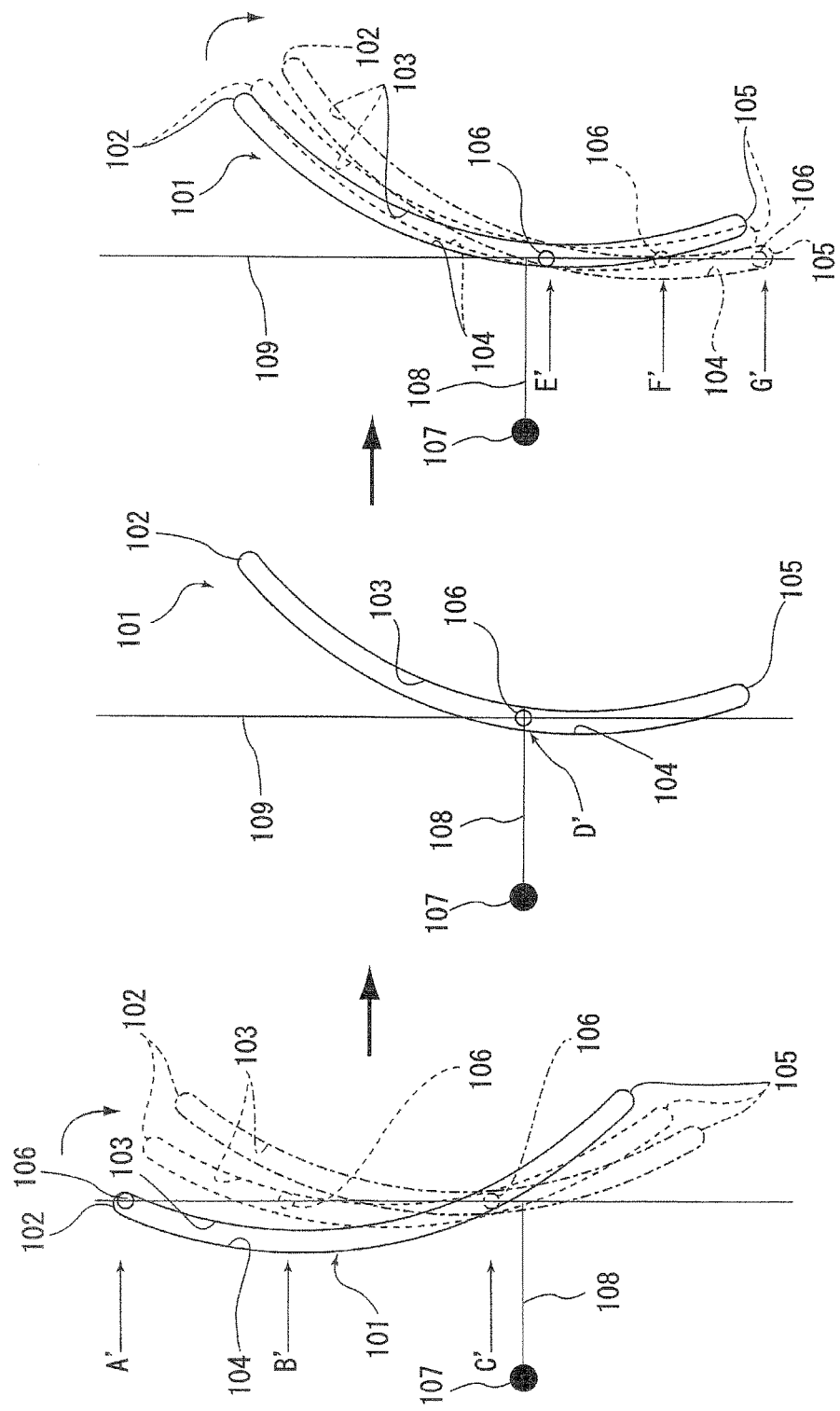
FIG. 20 is a diagram explaining the related art.

FIG. 15 is a diagram explaining an example of a width direction detector. FIG. 16 is a side view illustrating another example of the width direction detector. FIG. 17 is a diagram illustrating another example of the width direction detector. FIG. 18 is a diagram illustrating a state of a lever member at the time of feeding a paper sheet of size M shown in FIG. 17. FIG. 19 is a diagram illustrating a state of the lever member at the time of feeding a paper sheet of size N shown in FIG. 17.

Note that, in the X-Y-Z coordinate system illustrated in each diagram, the X direction corresponds to a movement direction of a recording head and a width direction of the recording apparatus, the Y direction corresponds to a medium transport direction and a depth direction of the recording apparatus, and the Z direction corresponds to an apparatus height direction. In addition, the +Y direction side corresponds to the apparatus front surface side and the −Y direction side corresponds to the apparatus rear surface side. Moreover, hereinafter, the direction in which a paper sheet is transported in the printer will be referred to as "downstream" and the opposite direction will be referred to as "upstream".

Overall Configuration of Printer

Hereinafter, the overall configuration of a printer 1 will be briefly described with reference mainly to FIG. 1.

The printer 1 (FIG. 1) according to the invention includes a scanner section 3 on an upper portion of an apparatus main body 2 that includes a recording head 7 for performing recording on a paper sheet as a "medium", that is, functions as a multi-function machine that includes a scanner function as well as an ink jet recording function.

First, an overview of the scanner section 3 (see FIG. 1) that reads an image of a document will be described. The scanner section 3 includes a reading mechanism unit 3b that includes a document table 3a on which a document is placed on the upper surface thereof and a feeding mechanism unit 3c that is capable of switching between a closed position and an open position with respect to the reading mechanism unit 3b. In this embodiment, the feeding mechanism unit 3c is rotatable with respect to the reading mechanism unit 3b with an end portion of the apparatus rear surface side as a rotation fulcrum.

Thus, it is possible to set a document on the document table 3a by setting the feeding mechanism unit 3c to the open position with respect to the reading mechanism unit 3b.

Moreover, a reader (not illustrated) capable of reading a to-be-read surface of the document set on the document table 3a is provided inside the reading mechanism unit 3b. Moreover, the feeding mechanism unit 3c is capable of transporting a document set on a document setting unit 3d toward a document discharge tray 3e and is capable of reading the to-be-read surface of the document by using the reader during transport of the document.

Subsequently, returning to the description of the apparatus main body 2, outside the apparatus main body 2, there are provided ink container storing cases 4a and 4b for storing ink containers (not illustrated) that contain ink.

In FIG. 1, the ink container storing cases 4a and 4b are provided on either side of the apparatus in the width direction (X axis direction), and a plurality of ink containers corresponding to inks of respective colors of magenta, yellow, and cyan are stored in the ink container storing case 4a located on the right side of the apparatus in the width direction, and an ink container containing black ink is stored in the ink container storing case 4b located on the left side of the apparatus in the width direction. Ink is supplied from each of the ink containers to the recording head 7 described later via an ink tube (not illustrated).

In the apparatus main body 2, the recording head 7 is mounted on a carriage 8 that is capable of moving in the X axis direction in FIG. 1, and ejects ink onto a recording paper sheet that has been sent to a region facing the recording head 7 so as to perform recording.

Paper Sheet Transport Path of Printer

Next, the paper sheet transport path of the printer 1 will be described with reference to FIG. 2 and FIG. 3. In addition, in FIG. 2, the dotted line denoted by the reference sign P indicates the paper sheet transport path.

A paper feed cassette 6 (also refer to FIG. 1) that includes a containing portion 6a capable of containing a plurality of paper sheets is provided in a lower portion of the apparatus main body 2 illustrated in FIG. 2. The containing portion 6a is capable of containing media of a plurality of sizes.

A pair of width direction edge guides 22a and 22b that can move in a direction (X axis direction) that intersects the transport direction so as to match the width of the contained paper sheets, and a rear end guide 23 that guides the rear end of the contained paper sheets in the feeding direction and that can move in the feeding direction (Y axis direction) in accordance with the size of the paper sheets are provided in the containing portion 6a of the paper feed cassette 6 illustrated in FIG. 3.

The width direction edge guides 22a and 22b can move toward and away from each other in the X axis direction by a rack and pinion mechanism (not illustrated), and one of the width direction edge guides 22a and 22b moves in conjunction with movement of the other. The rear end guide 23 also includes a rack and pinion mechanism (a first rack portion 27 and a pinion gear 26) described later and can move in the Y axis direction. The rear end guide 23 will be further described below.

The paper sheets are sent from the paper feed cassette 6 by a transport section 10 (FIG. 2). To be more specific, as illustrated in FIG. 2, a paper sheet picked up by a feeding roller 12 (also referred to as a pickup roller) is nipped by a transport driving roller 13 that is driven by a driving source (not illustrated) so as to rotate and a separation roller 14 that is made to rotate by the transport driving roller 13, is once fed to the rear side (−Y direction) of the apparatus, and is sent to the front side (+Y direction) of the apparatus through a curved transport path 17 formed of an intermediate roller 16.

Subsequently, a transport roller pair 18 is provided on the upstream side of the recording head 7 in the medium transport direction (the rear side of the apparatus, −Y direction), and the paper sheet is sent below the recording head 7 by the transport roller pair 18.

The paper sheet sent to the front side of the apparatus passes under the recording head 7 while being supported by a support member 19, and recording is performed with the ink ejected from the recording head 7.

A first discharge roller pair 20 and a second discharge roller pair 21 are provided on the downstream side of the recording head 7 in the medium transport direction (front side of the apparatus, +Y direction), and the paper sheet, after being recorded, is discharged to a discharge tray 5 that is provided on the front side of the apparatus.

Movement Mechanism of Rear End Guide

Next, the rear end guide 23 will be described. The rear end guide 23 includes a shaft portion 25 (FIG. 5) that engages with a guide groove 24 (FIG. 3) that extends in the Y axis direction in the containing portion 6a and the pinion gear 26 (FIG. 6) that has the shaft portion 25 as an axis. In addition, the guide groove 24 is formed as an opening that communicates with a rear surface 6b of the containing portion 6a. When the pinion gear 26 (FIG. 6 and FIG. 7) engages with the first rack portion 27 (FIG. 6) provided along the guide groove 24 and the rear end guide 23 is moved in the Y axis direction, the pinion gear 26 rotates and moves along the first rack portion 27 and the shaft portion 25 interlocked with the movement of the rear end guide 23 is guided by the guide groove 24 that is linear. With this configuration, the rear end guide 23 can perform smooth linear movement in the Y axis direction.

Here, the printer 1 includes a size detector 30 for detecting the size of a paper sheet set in the paper feed cassette 6 on the basis of the position of the rear end guide 23 which is moved in accordance with the size of the paper sheet.

Hereinafter, the configuration for detecting the size of the set paper sheet on the basis of the position of the rear end guide 23 by the size detector 30 will be further described.

Configuration for Detecting Size of Set Paper Sheet

A cam member 32 that is rotatable about a rotation fulcrum 31 provided in the paper feed cassette 6, that engages with the rear end guide 23 via the shaft portion 25 and that rotates in accordance with the movement of the rear end guide 23 is provided on the rear surface 6b side (FIG. 5) of the paper feed cassette 6. The size detector 30 detects the paper sheet size by detecting the rotation state of the cam member 32.

In addition, a rear cover 28 (FIG. 4) at least partially covering the region of the rear surface 6b that includes a region in which the cam member 32 is provided is provided on the rear surface 6b of the paper feed cassette 6.

Cam Member

The cam member 32 includes a cam groove 33 that the shaft portion 25 provided on the rear end guide 23 engages with and that converts the linear movement of the shaft portion 25 that is interlocked with the movement of the rear end guide 23 into rotational movement of the cam member 32 about the rotation fulcrum 31.

The cam groove 33 (refer to FIG. 7 and FIG. 8) includes one end 33a where the shaft portion 25 is positioned when the rear end guide 23 guides the smallest size paper sheet (postcard size in the present embodiment) among the plural paper sheet sizes contained in the containing portion 6a, and another end 33b where the shaft portion 25 is positioned when guiding the largest size paper sheet (A3 size in the present embodiment), and a pair of a first edge portion 33c and a second edge portion 33d which are provided so as to face each other and extend from the one end 33a to the other end 33b. Specifically, the cam groove 33 is formed entirely non-linearly, and the first edge portion 33c and the second edge portion 33d of the cam groove 33 are formed in a curved shape convex toward the rotation fulcrum 31 side.

In FIG. 8, the cam member 32 indicated by the solid line is in a state in which the shaft portion 25 is on the one end 33a of the cam groove 33 and the rear end guide 23 is at the guide position A of the smallest size paper sheet, and the cam member 32 indicated by the dash-dotted line is in a state in which the shaft portion 25 is on the other end 33b of the cam groove 33 and the rear end guide 23 is at the guide position G of the largest size paper sheet.

By forming the cam groove 33 in a curved shape, the shaft portion 25 moving along the first edge portion 33c or the second edge portion 33d of the cam groove 33 moves smoothly, and the rear end guide 23 can be moved with no problems.

When the rear end guide 23 moves from the guide position A of the smallest size paper sheet illustrated in FIG. 8 to the guide position G of the largest size paper sheet (moves from the upper side to the lower side in plan view in FIG. 8), the cam member 32 rotates in a clockwise direction in plan view in FIG. 8. In addition, when the rear end guide 23 moves from the guide position G side to the guide position A side (moving from the lower side to the upper side in plan view in FIG. 8), the movement of the shaft portion 25 and the cam member 32 is opposite to that when the rear end guide 23 moves from the guide position A side to the guide position G side. Hereinafter, the case where the rear end guide 23 moves from the guide position A side to the guide position G side will be described, and a description of the case where the rear end guide 23 moves in the opposite direction will be omitted.

When the rear end guide 23 moves from the guide position A to the guide position G, the shaft portion 25 which moves linearly in conjunction with the linear movement of the rear end guide 23 moves relatively to the cam groove 33 from the one end 33a of the cam groove 33 to the other end 33b. At this time, an external force applying portion T that applies an external force to the cam groove 33 in order for the shaft portion 25 to rotate the cam member 32 shifts from the first edge portion 33c to the second edge portion 33d in the region between the one end 33a and the other end 33b.

Specifically, the shaft portion 25 abuts against the first edge portion 33c on the inner side of the curve from the one end 33a up to a switching portion H (see the second diagram from the left in FIG. 10) in the cam groove 33, and abuts against the second edge portion 33d on the outer side of the curve until the shaft portion 25 reaches the other end 33b.

Here, a feature of the invention is that the region where the switching portion H (the second figure from the left in FIG. 10) in the cam groove 33 is located is between, from among guide positions between the guide position A (the leftmost diagram in FIG. 9) of the smallest size paper sheet of the rear end guide 23 to the guide position G (the rightmost diagram in FIG. 10) of the largest size paper sheet, guide positions of a "first medium" and a "second medium" having a relationship that the sizes thereof in the longitudinal direction are close to each other and the movement distance of the rear end guide 23 in the longitudinal direction is the largest. The position of the switching portion H will be described in detail.

Next, as illustrated in plan view in FIG. 8, the cam member 32 has a fan shape extending from the rotation fulcrum 31, and includes a cam outer periphery rack portion 34 (FIGS. 5 and 7) on the outer periphery of a curved portion of the cam member 32 at a position away from the rotation fulcrum 31.

As illustrated in FIG. 5 and FIG. 7, the cam outer periphery rack portion 34 engages with a cam follower rack portion 41 provided in a cam follower 40 that moves in accordance with the rotation of the cam member 32.

Note that, in FIG. 8, description of the cam outer periphery rack portion 34 and the cam follower rack portion 41 has been omitted.

In the paper feed cassette 6, the cam follower 40 is provided at a position (in this embodiment, the end portion of the paper feed cassette 6 on the −X side of the rear surface 6b of the containing portion 6a illustrated in FIG. 5) away from the rear end guide 23 in the width direction (X axis direction) that intersects the paper sheet feeding direction. Because the cam outer periphery rack portion 34 of the cam member 32 and the cam follower rack portion 41 of the cam follower 40 are engaged with each other, the cam follower 40 moves along the feeding direction, that is, along the Y axis direction, in accordance with the rotation of the cam member 32.

In FIG. 7, when the cam member 32 rotates in the clockwise direction (+R direction), the cam follower 40 moves in the +Y direction, and when the cam member 32 rotates counterclockwise (−R direction), the cam follower 40 moves in the −Y direction. That is, the cam follower 40, via the cam member 32, follows the movement of the rear end guide 23 and moves linearly in the same direction as the rear end guide 23.

A detection plate 42 (FIG. 5 and FIG. 7) described later is provided on the cam follower 40, and the detection plate 42 moves integrally with the cam follower 40 that moves in the Y axis direction. The detection plate 42 will be described in detail after the size detector 30 has been described.

Size Detector

The size detector 30 (FIG. 11) according to this embodiment includes cassette side levers 43 each functioning as a "lever" that can switch on and off and a control unit 51 that determines paper sheet size on the basis of the operation of the cassette side levers 43.

In this embodiment, as shown in FIG. 11, three cassette side levers 43 (cassette side levers 43a, 43b, and 43c) are provided on the −X direction side surface of the paper feed cassette 6. Note that the cassette side levers 43a, 43b, and 43c are held by a lever holder 44 illustrated in FIG. 5 on the −X direction side surface of the paper feed cassette 6; however, in FIG. 11, the lever holder 44 is not illustrated in order to make it easy to understand the configuration of constituent members hidden by the lever holder 44 such as the detection plate 42.

The three cassette side levers 43a, 43b, and 43c rock about, as an axis, a rocking shaft 45 (indicated by a dotted line in FIG. 11) provided in the lever holder 44, and can be switched on and off by switching from a protruding state in which the end portions (+Y direction portions) of the cassette side levers 43a, 43b, and 43c on the side distant from the rocking shaft 45 protrude in one direction (+X direction in FIG. 11) and a retracted state in which the end portions are retracted in a direction opposite to the one direction (−X direction in FIG. 11).

In FIG. 11, the cassette side lever 43a is in the protruding state, and the cassette side lever 43b and the cassette side lever 43c are in the retracted state.

In addition, the switching between the protruding state and the retracted state of the cassette side levers 43 will be described in detail in the description of the detection plate 42 provided on the cam follower 40.

When the paper feed cassette 6 is attached to the apparatus main body 2, three main body side levers 46a, 46b, and 46c (main body side levers 46) (FIG. 11) are respectively provided at positions on the apparatus main body 2 corresponding to the cassette side levers 43a, 43b, and 43c.

The main body side levers 46a, 46b, and 46c are provided with a rocking shaft 47, and one-side end portions 48a, 48b, and 48c thereof are respectively in contact with the +Y side end portions of the cassette side levers 43a, 43b, and 43c, and the protruding state and the retracted state of the cassette side levers 43a, 43b, and 43c correspond to the protruding state and the retracted state of the one-side end portions 48a, 48b, and 48c. Note that the protruding direction corresponding to the protruding state of the cassette side levers 43a, 43b, and 43c is the −Y direction and the retracting direction corresponding to the retracted state of the cassette side levers 43a, 43b, and 43c is the +Y direction.

Other-side end portions 49a, 49b, and 49c of the main body side levers 46a, 46b, and 46c are respectively in contact with switches 50a, 50b, and 50c (switches 50), and the switches 50a, 50b, and 50c are switched between on and off states in response to switching between the protruding state and the retracted state of the cassette side levers 43a, 43b, and 43c.

The on and off states of the switches 50a, 50b, and 50c which are changed as a result of switching between the protruding state and the retracted state of the cassette side levers 43a, 43b, and 43c are transmitted to the control unit 51, and the control unit 51 determines the paper sheet size on the basis of the on and off combination of the switches 50a, 50b, and 50c. For example, when the switches 50a, 50b, and 50c are respectively on, on, and on, the paper sheet size can be determined to be postcard size, and when the switches 50a, 50b, and 50c are respectively off, off, and on, the paper sheet size can be determined to be A4 size.

The number of the cassette side levers 43 and the main body side levers 46 and the switches 50 corresponding thereto can be changed in accordance with the variety of paper sheet sizes that can be contained in the paper feed cassette 6. For example, if there are two cassette side levers 43, it is possible to distinguish between up to four different paper sheet sizes, and if there are three cassette side levers 43 as in the present embodiment, it is possible to distinguish between up to eight different paper sheet sizes.

Detection Plate

Subsequently, switching between the protruding state and the retracted state of the cassette side levers 43 by the detection plate 42 will be described.

Switching between the protruding state and the retracted state of the cassette side levers 43 is performed by the detection plate 42 provided on the cam follower 40.

The detection plate 42 (refer to FIG. 11) includes slit portions 52 that enable the cassette side levers 43 to be in the protruding state and a plate surface portion 53 that maintains the cassette side levers 43 in the retracted state, and in accordance with the position of the cam follower 40, the combination of the protruding state and the retracted state of the cassette side levers 43a, 43b, and 43c can be switched, and the on and off combination of the switches 50a, 50b, and 50c can be switched.

As illustrated in FIG. 11, the cassette side levers 43a, 43b, and 43c include convex portions 54a, 54b, and 54c at positions facing the detection plate 42, respectively. When the detection plate 42 is in the position illustrated in FIG. 11, there is a slit portion 52 in the detection plate 42 at a position facing the convex portion 54a of the cassette side lever 43a, and at positions facing the convex portion 54b of the cassette side lever 43b and the convex portion 54c of the cassette side lever 43c, there is the plate surface portion 53. At this time, because the convex portion 54a of the cassette side lever 43a enters the slit portion 52, the cassette side lever 43a is in a protruding state in which the cassette side lever 43a has rocked to the +X side. On the other hand, the cassette side lever 43b and the cassette side lever 43c are maintained in the retracted states because the convex portion 54b and the convex portion 54c corresponding thereto are restricted by the plate surface portion 53 and do not rock in the +X direction.

As described above, the cam follower 40 provided with the detection plate 42, via the cam member 32, moves linearly in the Y axis direction in conjunction with the linear movement of the rear end guide 23.

FIG. 7 illustrates a state in which the rear end guide 23 is at the guide position of the smallest size paper sheet (the shaft portion 25 is at the one end 33a of the cam groove 33), and the convex portion 54a of the cassette side lever 43a, the convex portion 54b of the cassette side lever 43b (not illustrated in FIG. 7), and the convex portion 54c of the cassette side lever 43c (not illustrated in FIG. 7) face the detection plate 42 at a position near the +Y direction side of the detection plate 42.

When the rear end guide 23 moves linearly to the guide position of the largest size paper sheet, the cam member 32 rotates in the +R direction, the cam follower 40 and the detection plate 42 linearly move in the +Y direction, and the convex portions 54a, 54b, and 54c of the cassette side levers 43 face the detection plate 42 at a position near the −Y direction of the detection plate 42 in FIG. 7.

By forming the slit portions 52 or the plate surface portion 53 at positions facing the convex portions 54a, 54b, and 54c of the cassette side levers 43 of the detection plate 42 linearly moving together with the linear movement of the rear end guide 23, the combination of the protruding state and the retracted state of the cassette side levers 43a, 43b, and 43c (on and off combination of the switches 50a, 50b, and 50c) can be changed in accordance with the position of the rear end guide 23.

Position of Switching Portion in Cam Member

As described above, the cam member 32 has a configuration in which, when the shaft portion 25 moves relative to the cam groove 33 from the one end 33a of the cam groove 33 to the other end 33b, the external force applying portion T for applying an external force to the cam groove 33 in order to make the shaft portion 25 rotate the cam member 32 switches from the first edge portion 33c to the second edge portion 33d with the switching portion H as a boundary (refer to FIG. 9 and FIG. 10).

The line AA connecting the position of the switching portion H (the second drawing from the left in FIG. 10) and the rotation fulcrum 31 is at a position that is perpendicular to the movement locus BB of the shaft portion 25.

In this configuration, when the external force applying portion T for applying an external force to the cam groove 33 by the shaft portion 25 is switched from the first edge portion 33c to the second edge portion 33d, the shaft portion 25 does not apply an external force to either of the first edge portion 33c or the second edge portion 33d inside the cam groove 33 in the switching portion H. Moreover, even in the vicinity of the switching portion H (the area denoted by reference sign S in the second diagram from the left in FIG.

10), the contact angle of the shaft portion 25 with respect to the external force applying portion T (the angle formed by the tangential line at the external force applying portion T and a straight line along the movement direction of the shaft portion 25) becomes small and it is difficult to apply the external force from the shaft portion 25.

In this way, in the cam groove 33, a region where the shaft portion 25 does not apply an external force or a region where it is difficult for an external force to be applied by the shaft portion 25 is called a transmission failure region S (the second figure from the left in FIG. 10). In the transmission failure region S, there is a possibility that the accuracy of correspondence between the straight movement of the shaft portion 25 and the rotation of the cam member 32 may be lowered, and the accuracy of detection of the paper sheet size by the size detector 30 may also decrease.

Moreover, in the transmission failure region S, as a consequence of the contact angle being small, the cam groove 33 may move with respect to the shaft portion 25, which is in a non-moving state, as a result of an external force other than that of the shaft portion 25 or an external force received from an impact. For example, when the paper feed cassette 6, which has been removed from the apparatus main body 2, is turned in the Y-axis direction in the direction of gravity, the cam member 32 rotates due to its own weight or the cam member 32 may rotate in the case of an impact when the paper feed cassette 6 is dropped or the like.

When the position of the cam groove 33 relative to the shaft portion 25 deviates from the normal position, the position of the shaft portion 25 no longer corresponds to the position of the detection plate 42 that moves in accordance with the movement of the shaft portion 25 via the cam member 32 and the accuracy of the paper sheet size detection by the size detector 30 is reduced.

Therefore, in the invention, the position of the switching portion H in the cam groove 33 is, from among guide positions between the guide position of the smallest size paper sheet (postcard size) of the rear end guide 23 to the guide position of the largest size paper sheet (A3), set between guide positions corresponding to the "first medium" and the "second medium" having a relationship in which the sizes thereof in the longitudinal direction are close to each other and the movement distance of the rear end guide 23 in the longitudinal direction is the largest.

In other words, the "first medium" and "second medium" are two paper sheets having sizes in the longitudinal direction that are close to each other among a plurality of types of paper sheet set in the paper feed cassette 6.

In the paper feed cassette 6 of this embodiment, as paper sheets to be contained in the containing portion 6a, seven paper sheet sizes, namely, postcard size (148 mm×100 mm), B6 size (182 mm×128 mm), A5 size (210 mm×148 mm), B5 size (257 mm×182 mm), A4 size (297 mm×210 mm), B4 size (364 mm×257 mm), and A3 size (420 mm×297 mm) can be detected.

In addition, the seven paper sheet sizes are merely examples, and examples of other paper sheet sizes may include, half letter size (215.9 mm×139.7 mm), letter size (279.4 mm×215.9 mm), legal size (355.6 mm×215.9 mm), and tabloid size (431.8 mm×279.4 mm).

Among the paper sheets of seven sizes, differences L between the sizes of sets of two paper sheets having sizes in the longitudinal direction that are close to each other are, from the leftmost figure to the rightmost figure in FIG. 9, a length difference L1 between postcard size (position A) and B6 size (position B), a length difference L2 between B6 size (position B) and A5 size (position C), and a length difference L3 between A5 size (position C) and B5 size (position D), and from the leftmost diagram to the rightmost diagram in FIG. 10, a length difference L4 between B5 size (position D) and A4 size (position E), a length difference L5 between A4 size (position E) and B4 size (position F), and a length difference L6 between B4 size (position F) and A3 size (position G).

Among these, the "first medium" and the "second medium" having the relationship that the movement distance of the rear end guide 23 in the longitudinal direction is the largest correspond to the A4 size and the B4 size the difference between which is the length difference L5 (the second figure from the right in FIG. 10).

The switching portion H in the cam groove 33 (the second figure from the left in FIG. 10) is between guide positions for A4 size and B4 size, that is, between position E and position F.

By providing the switching portion H at this position in the cam groove 33, because the transmission failure region S that includes the switching portion H can be separated the most from the guide position at the rear end of the paper sheets of each size, when detecting the rear edge position of the paper sheets of each size, it is possible to reduce the influence of the reduction in the accuracy of correspondence between the linear movement of the shaft portion 25 and the rotation of the cam member 32 in the transmission failure region S. Consequently, the accuracy of paper sheet positioning and size detection increases.

Moreover, a second rack portion 35 (FIG. 12) that engages with the pinion gear 26 provided on the shaft portion 25 when the shaft portion 25 is present in the transmission failure region S in the cam groove 33 may be provided in the cam member 32.

As illustrated in FIG. 13 and FIG. 14, in the transmission failure region S, the pinion gear 26 engages both of the first rack portion 27 provided along the guide groove 24 and the second rack portion 35.

Since the second rack portion 35 is provided in the cam groove 33, when the shaft portion 25 is positioned in the transmission failure region S where it is difficult to transmit the movement force of the shaft portion 25 to the cam member 32, because the second rack portion 35 and the pinion gear 26 provided on the shaft portion 25 are engaged with each other, the positional relationship between the shaft portion 25 and the cam groove 33 can be fixed. Therefore, when the shaft portion 25 is positioned in the transmission failure region S, for example, even if the paper feed cassette 6 is subjected to an impact, it is possible to reduce the likelihood that the positional relationship between the shaft portion 25 and the cam groove 33 (the cam member 32) changes.

Moreover, the cam groove 33 includes a wide portion 36 (FIG. 12 and FIG. 13) formed by cutting out at least one edge portion (the second edge portion 33d in this embodiment) in the transmission failure region S. The wide portion 36 is provided so as to correspond to the portion where the second rack portion 35 is provided.

While the pinion gear 26 of the shaft portion 25 is in the transmission failure region S and is linearly moving while being engaged with the second rack portion 35 of the cam member 32, the cam member 32 cannot rotate about the rotation fulcrum 31. If the cam member 32 does not rotate about the rotation fulcrum 31, the shaft portion 25, which moves linearly as is, strikes the cam groove 33 (the position of which is fixed because the cam member 32 does not rotate) and cannot proceed.

By providing the wide portion 36 in the transmission failure region S in the cam groove 33, when the pinion gear 26 of the shaft portion 25 is engaged with the second rack portion 35 of the cam member 32 and moves, it is possible to prevent the cam groove 33 from hindering the movement of the shaft portion 25.

Other Configurations of Sheet Feeding Cassette and Cam Member

Rear Cover of Paper Feed Cassette

A rear cover 60 (FIG. 4) that covers the cam member 32 and the like on the rear surface 6b of the paper feed cassette 6 is attached to the rear surface 6b by a plurality of screws 61.

Among the plurality of screws 61, three screws 61a, 61b, and 61c provided at the center portion of the rear cover 60 in the Y axis direction are provided at positions that overlap the cam member 32 in the X axis direction.

The screw 61a is provided at a position close to the rotation fulcrum 31 (refer to FIG. 4) of the cam member 32. The screw 61c is provided at a position close to the cam member 32 in the −X direction. The screw 61b is between the screw 61a and the screw 61c and is provided substantially in the center portion of the cam member 32 in the X axis direction. In addition, in the rear surface 6b of the paper feed cassette 6 illustrated in FIG. 5, reference signs 62a, 62b, and 62c denote screw holes for attaching the screws 61a, 61b, and 61c, respectively.

Because the cam member 32 is covered with the rear cover 60 while being pressed at three points by the three screws 61a, 61b, and 61c aligned in the X axis direction, it is possible to attach the rear cover 60 while holding down the cam member 32 in a balanced manner.

In addition, in the cam member 32, the openings 37a, 37b, and 37c are openings for preventing the screws 61a, 61b, and 61c and the cam member 32 from abutting against each other when the cam member 32 rotates.

Width Direction Detector for Detecting Size in Paper Sheet Width Direction

When recording is performed by discharging a liquid (ink) onto a paper sheet, there are cases where the recording surface curls outward. The cut paper sheet used in the recording apparatus is generally "longitudinal" in which the paper grain (the direction of flow of the fiber at the time of papermaking) of the paper sheet is along the long side, and the curl, after recording has been performed, occurs in a direction in which the long sides of the paper sheet approach each other.

If the front end or the rear end in the transport direction curls after recording, the likelihood of jamming when the paper sheet comes into contact with the recording head 7 and at the time of transport increases. Consequently, the paper sheet is set for "vertical insertion" in such a manner that the long side of the paper sheet is along the transport direction with respect to the paper feed cassette 6 and the size detector 30 determines the position of the rear end of the long side of the paper sheet and the paper sheet size on the basis of the detected position of the rear end guide 23.

Here, because paper sheets up to "A3 size" (length 420 mm×width 297 mm) for "vertical insertion" may be set in the paper feed cassette 6, it may be possible to set a small size paper sheet in the containing portion 6a in which the short side is along the transport direction, that is, "horizontal insertion".

Thus, for example, when a paper sheet of A4 size (length 297 mm×width 210 mm) is set for "horizontal insertion", the rear end position thereof is the same as the rear end position of a paper sheet of A5 size (length 210 mm×width 148 mm) set for "vertical insertion".

In this case, the size detector 30 for determining the paper size on the basis of the position of the rear end guide 23 determines that the paper sheet of A4 size set for "horizontal insertion" is the paper sheet of A5 size set for "vertical insertion".

In order to avoid this problem, the printer 1 is provided with a width direction detector 70 that performs detection on the basis of the positions of width direction edge guides 22a and 22b.

As the width direction detector 70, for example, a light sensor can be used. The width direction detector 70 is provided in the vicinity of one of the width direction edge guides 22a and 22b (in this embodiment, the width direction edge guide 22a on the +X side). The width direction edge guide 22a on the +X side is moved in the +X direction in FIG. 15 when the width size of the paper sheet increases and moves in the −X direction when the width size of the paper sheet decreases.

The width direction detector 70 includes a light emitting unit 71 that emits light, a light receiving unit 72 that faces the light emitting unit 71 in the height direction (Z direction) and receives light emitted from the light emitting unit 71, and a rotation member 74 that rotates about a rotation shaft 73 as an axis and that can take a light blocking state (top figure of FIG. 15) in which a tip portion 74a is positioned between the light emitting unit 71 and the light receiving unit 72 and a light transmitting state (bottom figure of FIG. 15) in which the tip portion 74a is deviated from the position between the light emitting unit 71 and the light receiving unit 72. The rotation member 74 is urged in the light blocking state by an urger 75 such as a coil spring.

The rotation member 74 includes a contact portion 74b on the opposite side of the tip portion 74a across the rotation shaft 73 and in the case where the width direction edge guide 22a on the +X side is at the position J in FIG. 15 or is on the −X side of the J position, the tip portion 74a of the rotation member 74 is in the light blocking state (top figure of FIG. 15) positioned between the light emitting unit 71 and the light receiving unit 72. At this time, the tip portion 74a blocks the light emitted from the light emitting unit 71 and stops the light from reaching the light receiving unit 72.

Moreover, when the width direction edge guide 22a on the +X side is on the +X side of the position J as illustrated in the lower figure of FIG. 15, the contact portion 74b is pushed by the width direction edge guide 22a, and the rotation member 74 rotates in the direction of the arrow against the urging force of the urger 75. When the rotation member 74 rotates, the light emitting state where the tip portion 74a is deviated from the position between the light emitting unit 71 and the light receiving unit 72 is achieved, and the light emitted from the light emitting unit 71 reaches the light receiving unit 72.

The position J corresponds to a paper sheet of a predetermined size and, in this embodiment, corresponds to the short side of B2 size of 182 mm. In the case where the size in the width direction (X axis direction) is larger than 182 mm, the light emitting state is achieved.

The combination of the detection result of the width direction detector 70 on the basis of the position of the width direction edge guide 22a and the detection result of the size detector 30 on the basis of the position of the rear end guide 23 makes it possible to recognize the "horizontal insertion" set state for B5 size or A4 size.

In the case where the set state of "horizontal insertion" is confirmed, it is preferable to prompt the user to check the set direction of the paper sheet by displaying a warning on an operation panel or by sounding an alarm sound or the like.

Modification Example of Width Direction Detector

Moreover, in the same way as the width direction detector 70, as a sensor using the rotation member 74 which is rotated by the movement of the width direction edge guide 22a, a width direction detector 80 using a lever type sensor (refer to FIG. 16 to FIG. 19) can be used. As illustrated in FIG. 16, the width direction detector 80 is provided at a position overlapping the feeding roller 12 in the Y axis direction on the apparatus main body 2, and includes a light emitting unit 81 (also refer to FIG. 17) that emits light toward a light receiving unit 82 (also refer to FIG. 17), the light receiving unit 82 that receives the light emitted from the light emitting unit 81, and a lever member 84 that rocks about a rocking shaft 83 as an axis. The lever member 84 can take a light blocking state (FIG. 16 and FIG. 18) in which a tip portion 84a is positioned between the light emitting unit 81 and the light receiving unit 82, and a light emitting state (FIG. 19) in which the tip portion 84a has deviated from the position between the light emitting unit 81 and the light receiving unit 82.

As illustrated in FIG. 17, the width direction detector 80 in the sheet width direction (X axis direction) is provided at a position away from the feeding roller 12 in the +X direction. In addition, it is of course possible to provide the width direction detector 80 on the −X side of the feeding roller 12.

A hopper 86 that rocks about, as an axis, a fulcrum 85 shown in FIG. 16 is provided in the containing portion 6a of the paper feed cassette 6. The tip of the hopper 86 in the paper sheet feeding direction (−Y direction) rocks in a direction toward the feeding roller 12 from the bottom side of the containing portion 6a. A paper sheet bundle P1 set in the paper feed cassette 6 is hopped up by the hopper 86 and is fed in contact with the feeding roller 12.

The lever member 84 of the width direction detector 80 enters the light blocking state when the paper sheet bundle P1 is not set or when the paper sheet bundle P1 is set but not hopped up (FIG. 16). When the lever member 84 is in the light blocking state, because the tip portion 84a is positioned between the light emitting unit 81 and the light receiving unit 82, the tip portion 84a blocks the light emitted from the light emitting unit 81 and stops the light from reaching the light receiving unit 82.

Moreover, the lever member 84 includes a convex portion 84b (FIG. 16, FIG. 18, and FIG. 19) located slightly lower than the roller surface of the feeding roller 12.

In the case where the paper sheet set in the paper feed cassette 6 has a size M that does not overlap the lever member 84 in the X axis direction in FIG. 17, from the state illustrated in FIG. 16, even if the hopper 86 is raised and the paper sheet bundle P1 is brought into contact with the feeding roller 12 as in FIG. 18, the uppermost paper sheet of the paper sheet bundle P1 does not come into contact with the convex portion 84b of the lever member 84. Therefore, the lever member 84 of the width direction detector 80 is maintained in the light blocking state.

However, in the case where a paper sheet of size N overlaps the lever member 84 in the X axis direction in FIG. 17, when the paper sheet set in the paper feed cassette 6 is raised, from the state illustrated in FIG. 16, by the hopper 86 and the paper sheet bundle P1 is brought into contact with the feeding roller 12 as in FIG. 19, the uppermost paper sheet of the sheet bundle P1 comes into contact with the convex portion 84b of the lever member 84 and pushes up the lever member 84, and the tip portion 84a of the lever member 84 enters a light transmitting state in which the tip portion 84a has deviated from the position between the light emitting unit 81 and the light receiving unit 82 in such a manner that the light emitted from the light emitting unit 81 reaches the light receiving unit 82.

With the above configuration, it is possible to detect that a paper sheet larger than a predetermined size has been set.

The entire disclosure of Japanese Patent Application No. 2016-224291, filed Nov. 17, 2016 is expressly incorporated by reference herein.

What is claimed is:

1. A recording apparatus comprising:
a paper feed cassette detachably provided in an apparatus main body and capable of containing media of a plurality of sizes,
a rear end guide that is provided in the paper feed cassette, that guides a rear end of a contained medium in a feeding direction, and that can move in a direction along the feeding direction in accordance with a size of the medium,
a cam member that is provided so as to be rotatable about a rotation fulcrum provided in the paper feed cassette, that engages a shaft portion provided on the rear end guide, and that rotates in accordance with movement of the rear end guide, and
a size detector that detects the size of the medium by detecting a rotation state of the cam member, wherein
the cam member has a cam groove that converts linear movement of the shaft portion interlocked with movement of the rear end guide into rotational movement of the cam member about the rotation fulcrum,
the cam groove includes one end, at which the shaft portion is located when the rear end guide guides a medium of the smallest size among the media of the plurality of sizes, another end, at which the shaft portion is located when the rear end guide guides a medium of the largest size among the media of the plurality of sizes, and a pair of a first edge portion and a second edge portion that extend so as to oppose each other from the one end to the other end, and is formed such that, when the shaft portion moves with respect to the cam groove from the one end to the other end of the cam groove, an external force applying portion that applies an external force to the cam groove in order to make the shaft portion rotate the cam member switches from the first edge portion to the second edge portion in a region between the one end and the other end, and
the region is, from among guide positions between a guide position of the rear end guide for the medium of the smallest size to a guide position of the rear end guide for the medium of the largest size, set between guide positions corresponding to a first medium and a second medium having a relationship in which sizes thereof in the longitudinal direction are close to each other and a movement distance of the rear end guide in the longitudinal direction is the largest.

2. The recording apparatus according to claim 1, further comprising
a cam follower that is provided at a position away from the rear end guide in the width direction that intersects the feeding direction, and that moves along the feeding direction in accordance with rotation of the cam member, wherein
the size detector includes at least two or more levers that switch on and off in accordance with a protruding state of protruding in one direction and a retracted state of being retracted more than the protruding state in a direction opposite to the one direction and a control unit for determining the size of the medium on the basis of an on and off combination of the two or more levers, and the cam follower includes a detection plate that includes slit portions that enable the levers to be in the protruding state and a plate surface portion that maintains the levers in the retracted state and that is capable of switching between on and off combinations of the two or more levers in accordance with a position of the cam follower.

3. The recording apparatus according to claim 1, wherein the first edge portion and the second edge portion of the cam groove are formed in a curved shape that is convex toward a side of the rotation fulcrum.

4. The recording apparatus according to claim 3 further comprising:

a first rack portion that is provided, as a moving mechanism of the rear end guide, on the paper feed cassette and that extends in a movement direction of the rear end guide and a pinion gear that is provided on the shaft portion of the rear end guide and that engages the first rack portion, and a second rack portion that engages with the pinion gear when the cam groove has the shaft portion present in a transmission failure region where it is difficult to transmit a movement force of the shaft portion to the cam member.

5. The recording apparatus according to claim 4, wherein the cam groove includes, in the transmission failure region, a wide portion formed by cutting out at least one of the first edge portion and the second edge portion.

* * * * *